US012621690B2

(12) United States Patent　　(10) Patent No.: US 12,621,690 B2

Wu et al.　　(45) Date of Patent: May 5, 2026

(54) METHOD AND DEVICE FOR CHANNEL MONITORING IN WIRELESS COMMUNICATION

(71) Applicant: Apogee 5G Global, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 341 days.

(21) Appl. No.: 18/144,176

(22) Filed: May 6, 2023

(65) Prior Publication Data

US 2023/0276281 A1　　Aug. 31, 2023

Related U.S. Application Data

(63) Continuation of application No. PCT/CN2021/135658, filed on Dec. 6, 2021.

(30) Foreign Application Priority Data

Dec. 7, 2020　(CN) .......................... 202011417501.1

(51) Int. Cl.
*H04W 72/23* (2023.01)
*H04L 1/1812* (2023.01)
(Continued)

(52) U.S. Cl.
CPC ........... *H04W 24/08* (2013.01); *H04L 1/1812* (2013.01); *H04L 5/0051* (2013.01); *H04W 72/1263* (2013.01); *H04W 72/23* (2023.01)

(58) Field of Classification Search
CPC ............... H04W 72/231; H04W 72/23; H04W 72/0446; H04W 72/232; H04W 72/1263;
(Continued)

(56) References Cited

U.S. PATENT DOCUMENTS

| | | | |
|---|---|---|---|
| 11,438,125 B2 | 9/2022 | Zhang | |
| 2016/0112977 A1* | 4/2016 | Byun | .................. H04W 72/541 370/350 |

(Continued)

FOREIGN PATENT DOCUMENTS

| | | |
|---|---|---|
| CN | 110149179 A | 8/2019 |
| CN | 111727583 A | 9/2020 |

(Continued)

OTHER PUBLICATIONS

ISR received in application No. PCT/CN2021/134696 dated Feb. 23, 2022.

(Continued)

*Primary Examiner* — Wei Zhao
(74) *Attorney, Agent, or Firm* — Volpe Koenig

(57)　　ABSTRACT

A user equipment (UE) is configured to transmit a first signal and determine a target reference signal based on the first signal. The UE is configured to monitor a first-type channel in a first resource set. The UE is configured to receive a downlink control information (DCI) that is used to schedule a first channel. The UE is configured to determine a target time based on the DCI and determine a first transmission state. The UE is configured to continue to monitor the first-type channel in the first resource set after the target time on a condition that the first transmission state is only applied for the first channel. The UE is configured to stop monitoring the first-type channel in the first resource set after the target time on a condition that the first transmission state is also applied for at least a second channel apart from the first channel.

18 Claims, 5 Drawing Sheets

(51) Int. Cl.
    *H04L 5/00*        (2006.01)
    *H04W 24/08*       (2009.01)
    *H04W 72/1263*     (2023.01)

(58) Field of Classification Search
     CPC ..... H04L 1/1812; H04L 5/0051; H04L 5/005;
                                              H04L 5/004
     See application file for complete search history.

(56)                References Cited

U.S. PATENT DOCUMENTS

| | | | |
|---|---|---|---|
| 2016/0285932 A1* | 9/2016 | Thyamagundalu | .......................... |
| | | | H04L 12/4633 |
| 2020/0112974 A1 | 4/2020 | Sun | |
| 2020/0314881 A1 | 10/2020 | Bagheri | |
| 2023/0155773 A1* | 5/2023 | Zhang | ................... H04L 5/0053 |
| | | | 370/329 |

FOREIGN PATENT DOCUMENTS

| | | | |
|---|---|---|---|
| WO | 2019048932 A2 | 3/2019 | |
| WO | 2020090120 A1 | 5/2020 | |
| WO | 2020164417 A1 | 8/2020 | |

OTHER PUBLICATIONS

Samsung Multi-beam enhancements 3GPP TSG RAN WG1 #103-e R1-2008148 Nov. 13, 2020.

NTT Docomo, Inc Discussion on multi-beam operation 3GPP TSG RAN WG1 #103-e R1-2009174 Nov. 13, 2020.

Interdigital Communications, "MAC Layer Impact of Supporting Different Services," 3GPP TSG-RAN WG2 #96, R2-168468, Reno, Nevada (Nov. 14-18, 2016).

Interdigital, Inc., "On Beam Management for DL Control and Data Channels," 3GPP TSG RAN WG1 Nr Ad-Hoc#2, R1-1710924, Qingdao, P.R. China (Jun. 27-30, 2017).

Third Generation Partnership Project, "Technical Specification Group Radio Access Network; NR; Multiplexing and channel coding (Release 16)," 3GPP TS 38.212 V16.3.0 (Sep. 2020).

Third Generation Partnership Project, "Technical Specification Group Radio Access Network; NR; Physical layer procedures for control (Release 16)," 3GPP TS 38.213 V16.3.0 (Sep. 2020).

Third Generation Partnership Project, "Technical Specification Group Radio Access Network; NR; Physical layer procedures for data (Release 16)," 3GPP TS 38.214 V16.3.0 (Sep. 2020).

Third Generation Partnership Project, "Technical Specification Group Radio Access Network; NR; Radio Resource Control (RRC) protocol specification (Release 16)," 3GPP TS 38.331 V16.2.0 (Sep. 2020).

\* cited by examiner

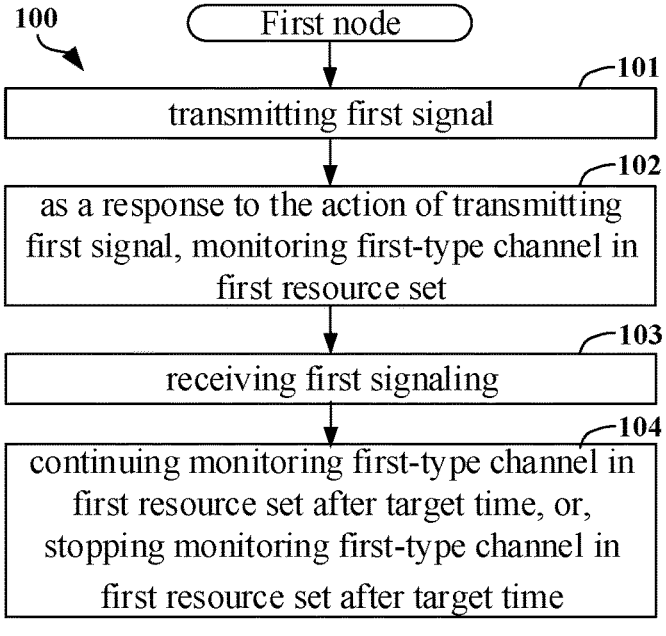

100

First node

↓

101 transmitting first signal

↓

102 as a response to the action of transmitting first signal, monitoring first-type channel in first resource set

↓

103 receiving first signaling

↓

104 continuing monitoring first-type channel in first resource set after target time, or, stopping monitoring first-type channel in first resource set after target time

FIG. 1

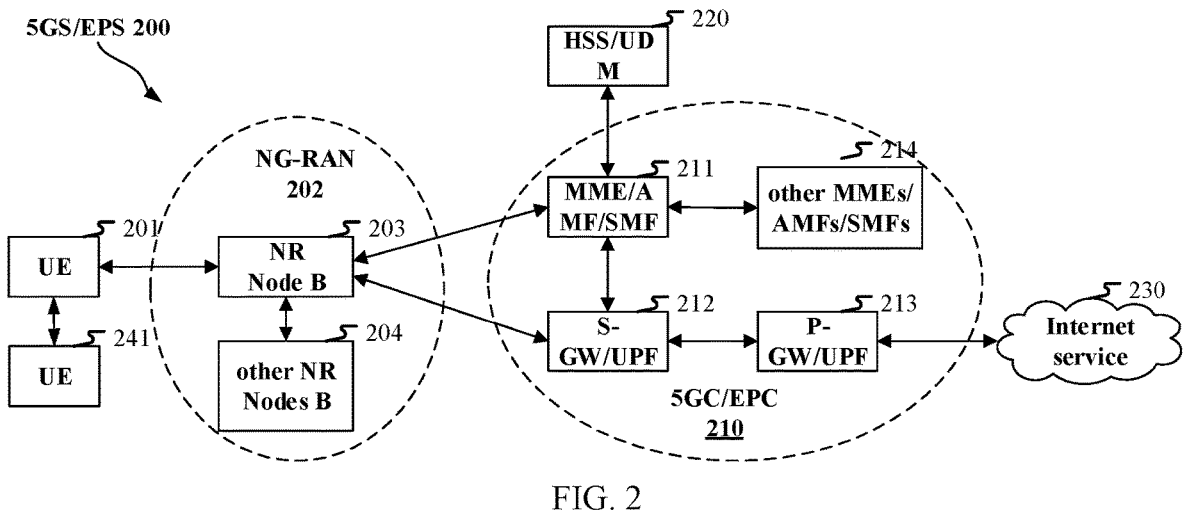

5GS/EPS 200

NG-RAN 202

HSS/UDM — 220

MME/AMF/SMF — 211 other MMEs/AMFs/SMFs — 214

UE — 201

NR Node B — 203

UE — 241 other NR Nodes B — 204

S-GW/UPF — 212

P-GW/UPF — 213

Internet service — 230

5GC/EPC 210

FIG. 2

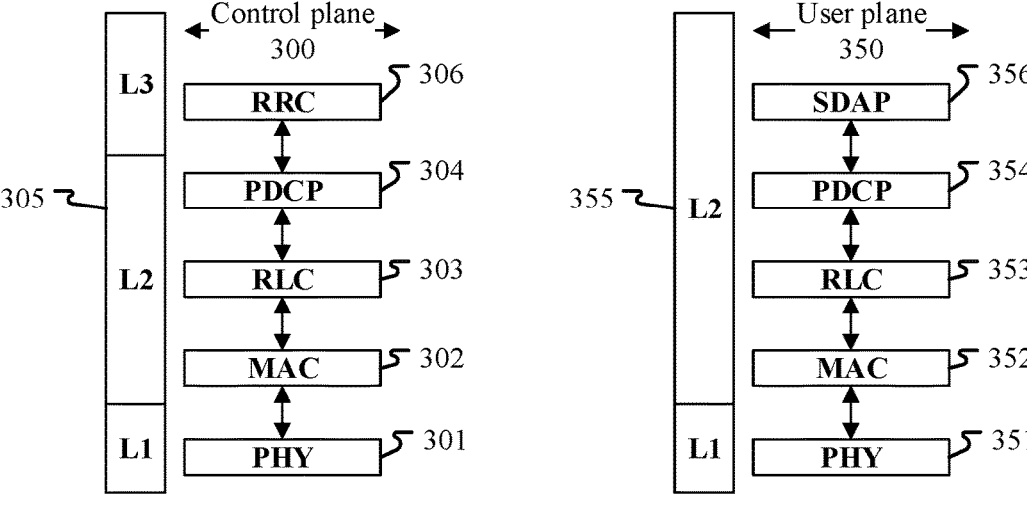

Control plane
300

L3 | RRC — 306

305 — | L2 | PDCP — 304
RLC — 303
MAC — 302

L1 | PHY — 301

User plane
350

356 — SDAP

355 — | L2 | PDCP — 354
RLC — 353
MAC — 352

L1 | PHY — 351

Transmitting processor
Multi-antenna transmitting processor
Transmitter
Receiver
Transmitter
Receiver
Multi-antenna transmitting processor
Transmitting processor

475

Memory
Controller /processor

476

Receiving processor
Multi-antenna receiving processor
Transmitter
Receiver
Transmitter
Receiver
Multi-antenna receiving processor
Receiving processor 470    472    418    454    458    456

420    452    420    452

459
Controller /processor
Memory    460
Data source    467

FIG. 4 first transmission state ——applied for——▸ first given channel

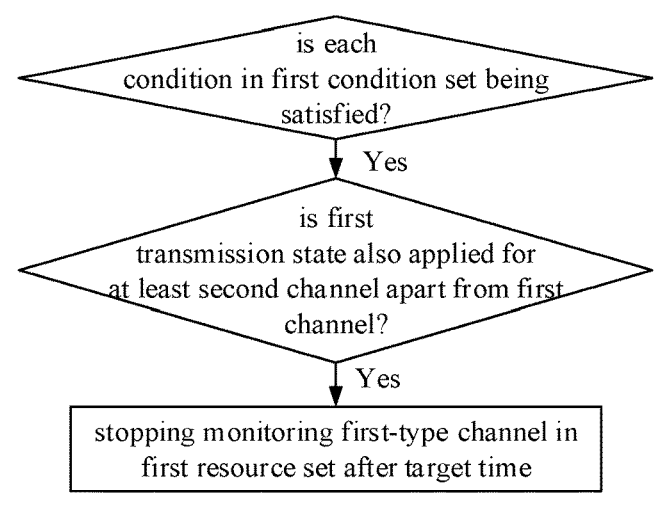

is each condition in first condition set being satisfied?

↓ Yes is first transmission state also applied for at least second channel apart from first channel?

↓ Yes stopping monitoring first-type channel in first resource set after target time

FIG. 11

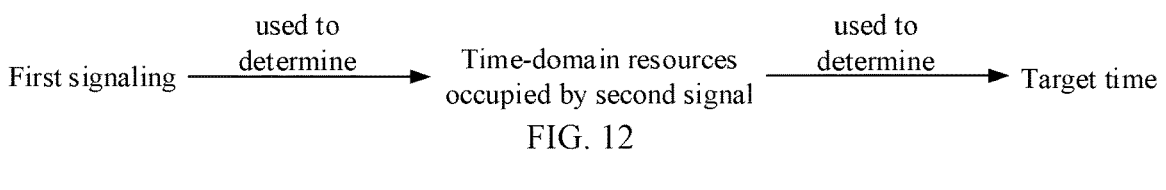

First signaling → used to determine → Time-domain resources occupied by second signal → used to determine → Target time

FIG. 12

First channel

Third signal

FIG. 13

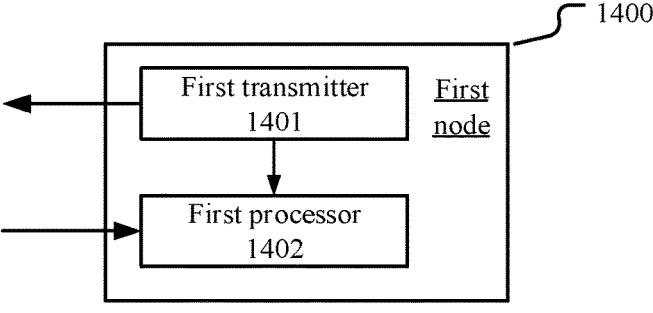

1400

First transmitter 1401        First node

First processor 1402

FIG. 14

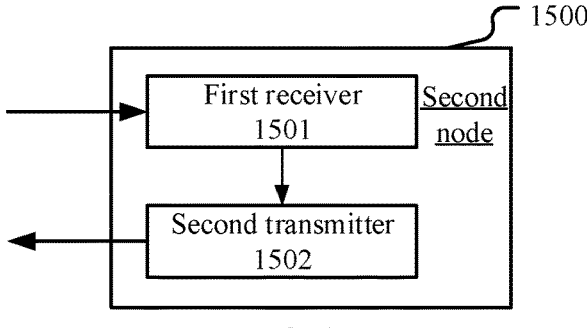

1500

First receiver 1501        Second node

Second transmitter 1502

FIG. 15

METHOD AND DEVICE FOR CHANNEL MONITORING IN WIRELESS COMMUNICATION

CROSS REFERENCE TO RELATED APPLICATIONS

This application is the continuation of the international patent application No. PCT/CN2021/135658, filed on Dec. 6, 2021, and claims the priority benefit of Chinese Patent Application No. 202011417501.1 filed on Dec. 7, 2020, the full disclosure of which is incorporated herein by reference.

BACKGROUND

Technical Field

The present application relates to transmission methods and devices in wireless communication systems, and in particular to a method and device for radio signal transmission in a wireless communication system supporting cellular networks.

Related Art

The Multi-antenna technique is a key part in the 3rd Generation Partner Project (3GPP) Long-term Evolution (LTE) and New Radio (NR) systems. More than one antenna can be configured, at the communication node, e.g., a base station or a User Equipment (UE), to obtain extra degree of freedom in space. Multiple antennas form through beamforming a beam pointing in a specific direction to enhance the communication quality. When the multiple antennas belong to multiple Transmitter Receiver Points (TRPs)/panels, spatial differences between TRPs/panels can be taken advantage of to obtain extra diversity gains. Since the beam formed by multiple antennas through beamforming is generally narrow, beams from both sides of communications are required to be aligned for performing effective communications. When transmitting/receiving beams are out of sync due to factors like UE mobility, a drastic reduction of communication quality will be seen, and even worse, the communications may be failed. In NR Release (R) 15 and 16, beam management is used for beam selection, updating and indication between both sides of communications, hence the performance gains obtained from multiple antennas.

SUMMARY

In NR R15 and R16, different beam management/indication mechanisms are respectively adopted by a control channel and a data channel, and for the uplink and the downlink. However, in many cases the control channel and the data channel can use the same beam, and since there exists channel reciprocity between an uplink channel and a downlink channel under many application scenarios, the same beam is also applicable. The complexity of the system can be greatly reduced exploiting such characteristic, so can the signaling overhead and the delay. At the 3GPP Radio Access Network (RAN) 1 #103e conference, the technique of using physical layer signaling to update beams for both the control channel and the data channel has been approved, which means that in scenarios where there exists reciprocity between uplink and downlink channels, the physical layer signaling can be used for updating uplink beams and downlink beams simultaneously. How the adoption of the technique will influence some of the existing beam-related functions is an issue to be solved.

To address the above problem, the present application provides a solution. It should be noted that although the statement above only took the example of cellular networks, the present application also applies to other scenarios like Vehicle-to-Everything (V2X), where similar technical effects can be achieved. Additionally, the adoption of a unified solution for various scenarios, including but not limited to cellular networks and V2X, contributes to the reduction of hardcore complexity and costs. In the case of no conflict, the embodiments of a first node and the characteristics in the embodiments may be applied to a second node, and vice versa. What's more, the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

transmitting a first signal;

as a response to the action of transmitting the first signal, monitoring a first-type channel in a first resource set;

receiving a first signaling, the first signaling being used to determine a target time; and continuing monitoring the first-type channel in the first resource set after the target time, or, stopping monitoring the first-type channel in the first resource set after the target time;

herein, the first signal is used for a random access, and the first signal is used to determine a target reference signal; for the monitoring of the first-type channel in the first resource set, the first node assumes same QCL parameters as the target reference signal; the first signaling comprises DCI; the first signaling is used for scheduling a first channel; the first signaling is used to determine a first transmission state, the first transmission state being applied for the first channel; when the first transmission state is only applied for the first channel, the first node continues monitoring the first-type channel in the first resource set after the target time; when the first transmission state is also applied for at least a second channel apart from the first channel, the first node stops monitoring the first-type channel in the first resource set after the target time.

In one embodiment, a problem to be solved in the present application includes: how to take advantage of using the physical layer signaling to update beams for an enhancement of the current mechanism of beam failure recovery.

In one embodiment, characteristics of the above method include: with the first signaling being a physical layer signaling, whether a monitoring over a Physical Downlink Control Channel (PDCCH) in a Recovery SearchSpace is to be terminated is determined according to whether the first signaling has updated multiple beams in different channels.

In one embodiment, an advantage of the above method includes: taking full advantage of the update of beams by the physical layer signaling, which accelerates the procedure of beam failure recovery.

According to one aspect of the present application, characterized in that first information is used to determine whether the first transmission state is also applied for at least the second channel apart from the first channel.

According to one aspect of the present application, characterized in that only when each condition in a first condition set is satisfied, the first node stops monitoring the first-type channel in the first resource set after the target time when the first transmission state is also applied for at least the second channel apart from the first channel; the first condition set comprises at least one condition.

According to one aspect of the present application, characterized in that the first condition set comprises that the first signaling is transmitted in the first resource set.

In one embodiment, the above method is advantageous in avoiding misunderstanding between the transmitter and receiver caused by missed detection of the first signal by the transmitter of the first signaling.

In one embodiment, the above method is advantageous in enhancing the receiving quality of the first signaling.

According to one aspect of the present application, characterized in that the first condition set comprises that the first node does not receive a second-type signaling after transmitting the first signal and before receiving the first signaling.

According to one aspect of the present application, characterized in comprising:
transmitting a second signal;
herein, the second signal is used to determine that the first signaling is correctly received; time-domain resources occupied by the second signal are used to determine the target time, the first signaling being used to determine the time-domain resources occupied by the second signal.

According to one aspect of the present application, characterized in comprising:
receiving a third signal in the first channel;
herein, the first signaling comprises scheduling information of the third signal, the second signal comprising a HARQ-ACK for the third signal.

According to one aspect of the present application, the first node is a UE.

According to one aspect of the present application, the first node is a relay node.

The present application provides a method in a second node for wireless communications, comprising:
receiving a first signal; and
transmitting a first signaling, the first signaling being used to determine a target time;
herein, the first signal is used for a random access, and the first signal is used to determine a target reference signal; as a response to the action of transmitting the first signal, a transmitter of the first signal monitors a first-type channel in a first resource set; for the monitoring of the first-type channel in the first resource set, the transmitter of the first signal assumes same QCL parameters as the target reference signal; the first signaling comprises DCI; the first signaling is used for scheduling a first channel; the first signaling is used to determine a first transmission state, the first transmission state being applied for the first channel; when the first transmission state is only applied for the first channel, the transmitter of the first signal continues monitoring the first-type channel in the first resource set after the target time; when the first transmission state is also applied for a second channel apart from the first channel, the transmitter of the first signal stops monitoring the first-type channel in the first resource set after the target time.

According to one aspect of the present application, characterized in that first information is used to determine whether the first transmission state is also applied for at least the second channel apart from the first channel.

According to one aspect of the present application, characterized in that only when each condition in a first condition set is satisfied, the transmitter of the first signal stops monitoring the first-type channel in the first resource set after the target time when the first transmission state is also applied for at least the second channel apart from the first channel; the first condition set comprises at least one condition.

According to one aspect of the present application, characterized in that the first condition set comprises that the first signaling is transmitted in the first resource set.

According to one aspect of the present application, characterized in that the first condition set comprises that the transmitter of the first signal does not receive a second-type signaling after transmitting the first signal and before receiving the first signaling.

According to one aspect of the present application, characterized in comprising:
receiving a second signal;
herein, the second signal is used to determine that the first signaling is correctly received; time-domain resources occupied by the second signal are used to determine the target time, the first signaling being used to determine the time-domain resources occupied by the second signal.

According to one aspect of the present application, characterized in comprising:
transmitting a third signal in the first channel;
herein, the first signaling comprises scheduling information of the third signal, the second signal comprising a HARQ-ACK for the third signal.

According to one aspect of the present application, the second node is a base station.

According to one aspect of the present application, the second node is a UE.

According to one aspect of the present application, the second node is a relay node.

The present application provides a first node for wireless communications, comprising:
a first transmitter, transmitting a first signal;
a first processor, as a response to the action of transmitting the first signal, monitoring a first-type channel in a first resource set;
the first processor, receiving a first signaling, the first signaling being used to determine a target time; and
the first processor, continuing monitoring the first-type channel in the first resource set after the target time, or, stopping monitoring the first-type channel in the first resource set after the target time;
herein, the first signal is used for a random access, and the first signal is used to determine a target reference signal; for the monitoring of the first-type channel in the first resource set, the first node assumes same QCL parameters as the target reference signal; the first signaling comprises DCI; the first signaling is used for scheduling a first channel; the first signaling is used to determine a first transmission state, the first transmission state being applied for the first channel; when the first transmission state is only applied for the first channel, the first node continues monitoring the first-type channel in the first resource set after the target time; when the first transmission state is also applied for at least a second channel apart from the first channel, the first node stops monitoring the first-type channel in the first resource set after the target time.

The present application provides a second node for wireless communications, comprising:

a first receiver, receiving a first signal; and a second transmitter, transmitting a first signaling, the first signaling being used to determine a target time;

herein, the first signal is used for a random access, and the first signal is used to determine a target reference signal; as a response to the action of transmitting the first signal, a transmitter of the first signal monitors a first-type channel in a first resource set; for the monitoring of the first-type channel in the first resource set, the transmitter of the first signal assumes same QCL parameters as the target reference signal; the first signaling comprises DCI; the first signaling is used for scheduling a first channel; the first signaling is used to determine a first transmission state, the first transmission state being applied for the first channel; when the first transmission state is only applied for the first channel, the transmitter of the first signal continues monitoring the first-type channel in the first resource set after the target time; when the first transmission state is also applied for a second channel apart from the first channel, the transmitter of the first signal stops monitoring the first-type channel in the first resource set after the target time.

In one embodiment, compared with the prior art, the present application is advantageous in the following aspects:

taking full advantage of the update of beams by the physical layer signaling, which accelerates the procedure of beam failure recovery.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of a first signal, a first-type channel and a first signaling according to one embodiment of the present application.

FIG. 2 illustrates a schematic diagram of a network architecture according to one embodiment of the present application.

FIG. 3 illustrates a schematic diagram of a radio protocol architecture of a user plane and a control plane according to one embodiment of the present application.

FIG. 4 illustrates a schematic diagram of a first communication device and a second communication device according to one embodiment of the present application.

FIG. 11 illustrates a schematic diagram of a first condition set according to one embodiment of the present application.

FIG. 12 illustrates a schematic diagram of a second signal according to one embodiment of the present application.

FIG. 13 illustrates a schematic diagram of a third signal according to one embodiment of the present application.

FIG. 14 illustrates a structure block diagram of a processing device in a first node according to one embodiment of the present application.

FIG. 15 illustrates a structure block diagram of a processing device in a second node according to one embodiment of the present application.

DESCRIPTION OF THE EMBODIMENTS

Figures 5, 6:
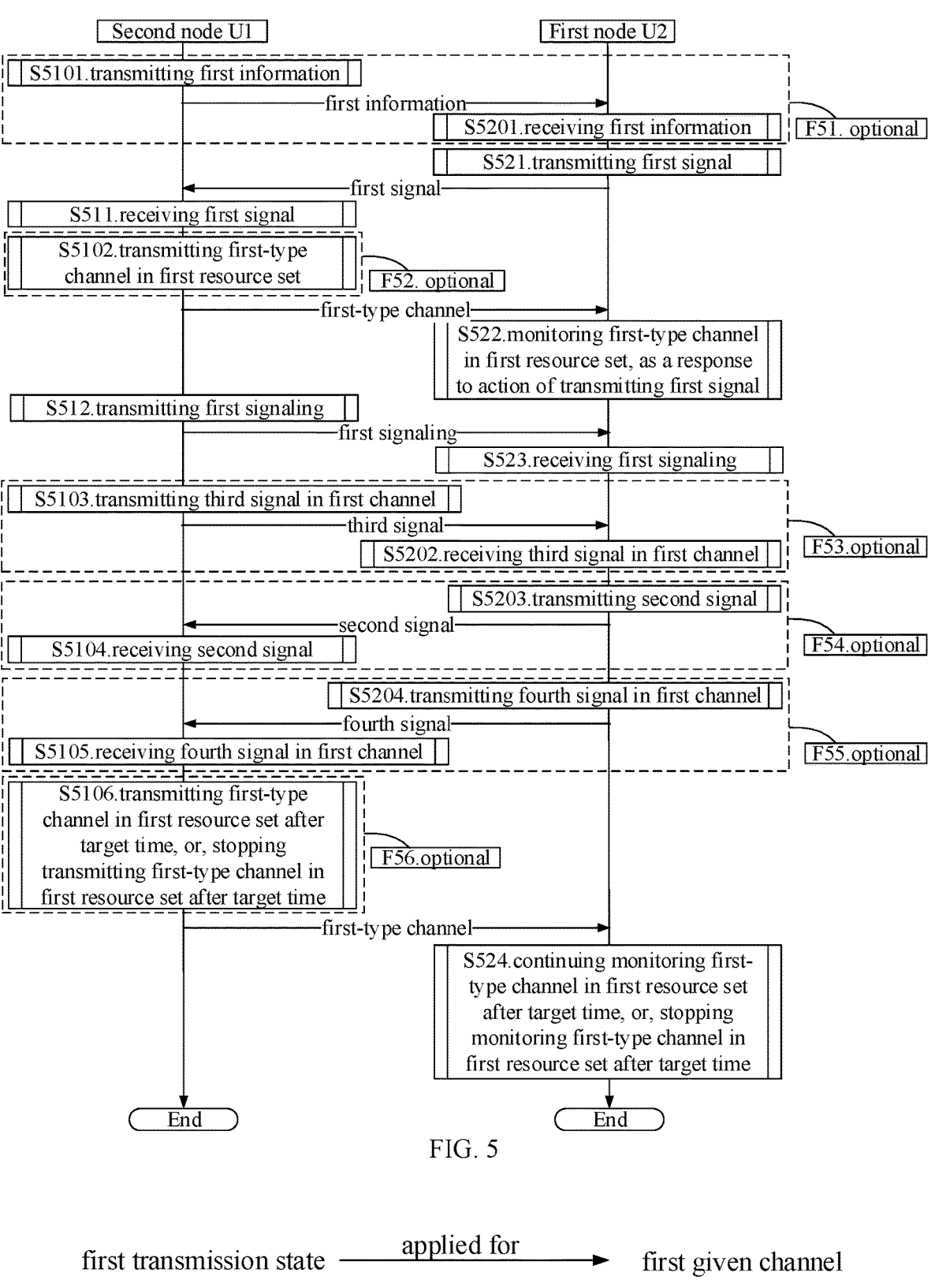
FIG. 5 illustrates a flowchart of transmission according to one embodiment of the present application.
FIG. 6 illustrates a schematic diagram of a first transmission state being applied for a given channel according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of a first signal, a first-type channel and a first signaling according to one embodiment of the present application, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present application transmits a first signal in step 101; and in step 102, as a response to the action of transmitting the first signal, monitors a first-type channel in a first resource set; receives a first signaling in step 103, the first signaling being used to determine a target time; and in step 104, continues monitoring the first-type channel in the first resource set after the target time, or, stops monitoring the first-type channel in the first resource set after the target time. herein, the first signal is used for a random access, and the first signal is used to determine a target reference signal; for the monitoring of the first-type channel in the first resource set, the first node assumes same QCL parameters as the target reference signal; the first signaling comprises DCI; the first signaling is used for scheduling a first channel; the first signaling is used to determine a first transmission state, the first transmission state being applied for the first channel; when the first transmission state is only applied for the first channel, the first node continues monitoring the first-type channel in the first resource set after the target time; when the first transmission state is also applied for at least a second channel apart from the first channel, the first node stops monitoring the first-type channel in the first resource set after the target time.

In one embodiment, whether the first transmission state is also applied for at least the second channel apart from the first channel is used to determine whether to continue monitoring the first-type channel in the first resource set after the target time.

In one embodiment, if the first transmission state is only applied for the first channel, the first node continues monitoring the first-type channel in the first resource set after the target time.

In one embodiment, if the first transmission state is also applied for at least the second channel apart from the first channel, the first node stops monitoring the first-type channel in the first resource set after the target time.

In one embodiment, when the first transmission state is only applied for the first channel, a Transmission Configuration Indicator (TCI) state of the second channel is unrelated to the first signaling.

In one embodiment, when the first transmission state is only applied for the first channel, a Quasi-Co-Located (QCL) parameter of the second channel is unrelated to the first signaling.

In one embodiment, when the first transmission state is only applied for the first channel, a spatial relation of the second channel is unrelated to the first signaling.

In one embodiment, a higher layer signaling is used for indicating whether the first transmission state is also applied for at least the second channel apart from the first channel.

In one embodiment, a Radio Resource Control (RRC) signaling is used for indicating whether the first transmission state is also applied for at least the second channel apart from the first channel.

In one embodiment, a Medium Access Control layer Control Element (MAC CE) is used for indicating whether the first transmission state is also applied for at least the second channel apart from the first channel.

In one embodiment, a physical layer signaling is used for indicating whether the first transmission state is also applied for at least the second channel apart from the first channel.

In one embodiment, a layer 1 (L1) signaling is used for indicating whether the first transmission state is also applied for at least the second channel apart from the first channel.

In one embodiment, the first signaling is used for indicating whether the first transmission state is also applied for at least the second channel apart from the first channel.

In one embodiment, as a response to the action of transmitting the first signal, the first node monitors the first-type channel in the first resource set starting from a second time; time-domain resources occupied by the first signal are used to determine the second time.

In one embodiment, the first signal occupies a time unit n in time domain, where the second time is a start time of a time unit (n+first interval); the first interval is a non-negative integer.

In one embodiment, the first interval is measured in the time unit.

In one embodiment, the first interval is measured in slots.

In one embodiment, the first interval is measured in sub-slots.

In one embodiment, the first interval is measured in multicarrier symbols.

In one embodiment, the first interval is fixed.

In one embodiment, the first interval is fixed to 4.

In one embodiment, the first interval is configured by a higher layer parameter.

In one embodiment, a said time unit is a slot.

In one embodiment, a said time unit is a sub-slot.

In one embodiment, a said time unit is a multicarrier symbol.

In one embodiment, a said time unit comprises a positive integer number of consecutive multicarrier symbols.

In one embodiment, a number of multicarrier symbol(s) comprised in a said time unit is configured by a higher-layer parameter.

In one embodiment, the first signal comprises a baseband signal.

In one embodiment, the first signal comprises a radio signal.

In one embodiment, the first signal comprises a radio frequency signal.

In one embodiment, the first signal comprises a first characteristic sequence.

In one embodiment, the first characteristic sequence comprises one or more of a pseudo-random sequence, a Zadoff-Chu sequence or a low-Peak-to-Average Power Ratio (low-PAPR) sequence.

In one embodiment, the first characteristic sequence comprises Cyclic Prefix (CP).

In one embodiment, the first signal comprises a Random Access Preamble.

In one embodiment, the first signal comprises a Random Access Channel (RACH) Preamble.

In one embodiment, the first signal comprises a contention-free random access preamble.

In one embodiment, the first signal comprises a contention-based random access preamble.

In one embodiment, the first signal comprises a random access preamble used for a Beam Failure Recovery Request.

In one embodiment, the first signal comprises Uplink control information (UCI).

In one embodiment, the first signal comprises a Link Recovery Request (LRR).

In one embodiment, the first signal comprises a MAC CE.

In one embodiment, the first signal comprises a Beam Failure Recovery (BFR) MAC CE or a Truncated BFR MAC CE.

In one embodiment, a channel occupied by the first signal includes a Physical Random Access CHannel (PRACH).

In one embodiment, a channel occupied by the first signal includes a Physical Uplink SharedCHannel (PUSCH).

In one embodiment, a channel occupied by the first signal includes a Physical Uplink Control Channel (PUCCH).

In one embodiment, a radio resource occupied by the first signal comprises a PRACH resource.

In one embodiment, a PRACH resource occupied by the first signal implicitly indicates a position of time-frequency resources of a PUSCH occupied by the first signal.

In one embodiment, a PRACH resource occupied by the first signal is used to determine the target reference signal.

In one embodiment, a PRACH resource occupied by the first signal belongs to a target PRACH resource set among the M PRACH resource sets, where M is a positive integer; the M PRACH resource sets respectively correspond to M reference signals; the target reference signal is a reference signal corresponding to the target PRACH resource set among the M reference signals; any of the M PRACH resource sets comprises at least one PRACH resource.

In one embodiment, there is one PRACH resource set among the M PRACH resource sets that only comprises 1 PRACH resource.

In one embodiment, there is one PRACH resource set among the M PRACH resource sets that comprises multiple PRACH resources.

In one embodiment, the M PRACH resource sets are configured by a higher layer parameter.

In one embodiment, a higher layer parameter configuring the M PRACH resource sets comprises all or partial information in a candidateBeamRSList field or a candidate-BeamRSListExt-v1610 field of a BeamFailureRecovery-Config Information Element (IE).

In one embodiment, a PRACH resource comprises a PRACH occasion.

In one embodiment, a PRACH resource comprises a random access preamble.

In one embodiment, a PRACH resource comprises a PRACH preamble.

In one embodiment, a PRACH resource comprises a random access preamble index.

In one embodiment, a PRACH resource comprises time-frequency resources.

In one embodiment, a PRACH resource comprises code-domain resources.

In one embodiment, the code-domain resources comprise one or more of a random access preamble, a PRACH preamble, a preamble sequence, a cyclic shift, a logical root sequence, a root sequence or a Zadoff-Chu sequence.

In one embodiment, a random access preamble comprised in the first signal is one of M random access preambles, where M is a positive integer; the M random access preambles respectively correspond to M reference signals; the target reference signal is a reference signal among the M reference signals that corresponds to the random access preamble comprised in the first signal.

In one embodiment, the M random access preambles are configured by a higher layer parameter.

In one embodiment, a higher layer parameter for configuring the M random access preambles comprises all or partial information in a candidateBeamRSList field or a candidateBeamRSListExt-v1610 field in a BeamFailureRecoveryConfig IE.

In one embodiment, M is equal to 1.

In one embodiment, M is greater than 1.

In one embodiment, M is no greater than 16.

In one embodiment, M is no greater than 64.

In one embodiment, the first signal comprises a first bit field, the first bit field comprising a positive integer number of binary bit(s); a value of the first bit field indicates the target reference signal.

In one embodiment, the target reference signal comprises a downlink reference signal.

In one embodiment, the target reference signal comprises an uplink reference signal.

In one embodiment, the target reference signal comprises a Channel State Information-Reference Signal (CSI-RS).

In one embodiment, the target reference signal comprises a Non-Zero Power (NZP) CSI-RS.

In one embodiment, the target reference signal comprises a Synchronisation Signal/physical broadcast channel Block (SSB).

In one embodiment, the target reference signal comprises a Sounding Reference Signal (SRS).

In one embodiment, the target reference signal is a CSI-RS or an SSB.

In one embodiment, the target reference signal is one of a CSI-RS, an SSB or an SRS.

In one embodiment, the reference signal comprises a reference signal resource.

In one embodiment, the reference signal comprises a reference signal port.

In one embodiment, modulation symbols comprised in the reference signal are known to the first node.

In one embodiment, the M reference signals comprise a CSI-RS.

In one embodiment, the M reference signals comprise an SSB.

In one embodiment, the M reference signals comprise an SRS.

In one embodiment, the first signaling comprises a physical-layer signaling.

In one embodiment, the first signaling is a physical layer signaling.

In one embodiment, the first signaling comprises a dynamic signaling.

In one embodiment, the first signaling comprises a layer 1 (L1) signaling.

In one embodiment, the first signaling is a layer 1 (L1) signaling.

In one embodiment, the first signaling comprises a layer 1 (L1) control signaling.

In one embodiment, the DCI refers to Downlink Control Information.

In one embodiment, the first signaling is DCI.

In one embodiment, the first signaling comprises DCI for DL Grant.

In one embodiment, the first signaling is DCI for DL Grant.

In one embodiment, the first signaling comprises DCI for UL Grant.

In one embodiment, the first signaling is DCI for UL Grant.

In one embodiment, time-frequency resources occupied by the first signaling belong to the first resource set.

In one embodiment, time-frequency resources occupied by the first signaling do not belong to the first resource set.

In one embodiment, a DCI format corresponding to the first signaling belongs to a first format set, the first format set comprising at least one DCI format.

In one embodiment, the first format set comprises DCI format 1_1.

In one embodiment, the first format set comprises DCI format 1_2.

In one embodiment, the first format set consists of DCI format 1_1 and DCI format 1_2.

In one embodiment, the first format set comprises one or more of DCI format 1_0, DCI format 0_0, DCI format 0_1 or DCI format 0_2.

In one embodiment, Cyclic Redundancy Check (CRC) of the first signaling is scrambled by a Radio Network Temporary Identifier (RNTI) in a first identifier set, the first RNTI set comprising at least one RNTI.

In one embodiment, the first identifier set comprises a Cell-RNTI (C-RNTI).

In one embodiment, the first identifier set only comprises a C-RNTI.

In one embodiment, the first identifier set comprises a Modulation and Coding Scheme (MCS)-C-RNTI.

In one embodiment, the first identifier set consists of a C-RNTI and an MCS-C-RNTI.

In one embodiment, the first identifier set comprises a Configured Scheduling (CS)-RNTI.

In one embodiment, a physical channel occupied by the first signaling is a said first-type channel.

In one embodiment, a physical channel occupied by the first signaling is not the first-type channel.

In one embodiment, the first signaling is a first-type signaling; the first node does not detect any other first-type signaling after transmitting the first signal and before receiving the first signaling.

In one embodiment, the first signaling is a first-type signaling; the first node does not detect any other first-type signaling in the first resource set after transmitting the first signal and before receiving the first signaling.

In one embodiment, the first signaling is a first-type signaling; the first signaling is a first said first-type signaling that the first node detects after transmitting the first signal.

In one embodiment, the first signaling is a first-type signaling; the first signaling is a first said first-type signaling that the first node detects in the first resource set after transmitting the first signal.

In one embodiment, the first-type signaling comprises DCI.

In one embodiment, the first-type signaling comprises a DCI format.

In one embodiment, a DCI format corresponding to any said first-type signaling belongs to the first format set.

In one embodiment, CRC of any said first-type signaling is scrambled by an RNTI in the first identifier set.

In one embodiment, the first signaling and the first signal belong to a same Bandwidth part (BWP) in frequency domain.

In one embodiment, the first signaling and the first signal belong to different BWPs in frequency domain.

In one embodiment, the first signaling and the first signal belong to a same Carrier in frequency domain.

In one embodiment, the first signaling and the first signal belong to different Carriers in frequency domain.

In one embodiment, the first signaling and the first signal belong to a same Cell in frequency domain.

In one embodiment, the first signaling and the first signal belong to different Cells in frequency domain.

In one embodiment, the first signal and the first resource set belong to a same BWP in frequency domain.

In one embodiment, the first signal and the first resource set belong to different BWPs in frequency domain.

In one embodiment, the first signal and the first resource set belong to a same Carrier in frequency domain.

In one embodiment, the first signal and the first resource set belong to different Carriers in frequency domain.

In one embodiment, the first signal and the first resource set belong to a same Cell in frequency domain.

In one embodiment, the first signal and the first resource set belong to different Cells in frequency domain.

In one embodiment, the first signaling and the first resource set belong to a same BWP in frequency domain.

In one embodiment, the first signaling and the first resource set belong to different BWPs in frequency domain.

In one embodiment, the first signaling and the first resource set belong to a same Carrier in frequency domain.

In one embodiment, the first signaling and the first resource set belong to different Carriers in frequency domain.

In one embodiment, the first signaling and the first resource set belong to a same Cell in frequency domain.

In one embodiment, the first signaling and the first resource set belong to different Cells in frequency domain.

In one embodiment, time-domain resources occupied by the first signaling are used to determine the target time.

In one embodiment, a time interval between the target time and a first reference time is a second interval; the first reference time is earlier than the target time, time-domain resources occupied by the first signaling being used to determine the first reference time.

In one embodiment, the first reference time is a start time of time-domain resources occupied by the first signaling.

In one embodiment, the first reference time is an end time of time-domain resources occupied by the first signaling.

In one embodiment, the first reference time is a start time of a time unit occupied by the first signaling.

In one embodiment, the first reference time is an end time of a time unit occupied by the first signaling.

In one embodiment, the second interval is measured in the time unit.

In one embodiment, the second interval is measured in slots.

In one embodiment, the second interval is measured in sub-slots.

In one embodiment, the second interval is measured in multicarrier symbols.

In one embodiment, the second interval is a non-negative integer.

In one embodiment, the second interval is fixed.

In one embodiment, the second interval is configured by a higher layer parameter.

In one embodiment, the first signaling comprises a first field, the first field comprising at least one binary bit; the first field in the first signaling indicates the first transmission state.

In one embodiment, the number of binary bit(s) comprised in the first field is equal to 1.

In one embodiment, the number of binary bit(s) comprised in the first field is greater than 1.

In one embodiment, the number of binary bit(s) comprised in the first field is equal to 3.

In one embodiment, the first field comprises information in a Transmission configuration indication field.

In one embodiment, the definition of the Transmission configuration indication field can be found in 3 GPP TS38.212, section 7.3.

In one embodiment, the first field indicates a TCI.

In one embodiment, the first field in the first signaling indicates a TCI codepoint corresponding to the first transmission state.

In one embodiment, a value of the first field in the first signaling is equal to a TCI codepoint corresponding to the first transmission state.

In one embodiment, the first field in the first signaling indicates a TCI-StateId corresponding to the first transmission state.

In one embodiment, any said first-type signaling comprises the first field.

In one embodiment, the sentence that the first signaling is used for scheduling a first channel includes a meaning that the first signaling indicates time-frequency resources occupied by the first channel.

In one embodiment, the sentence that the first signaling is used for scheduling a first channel includes a meaning that the first signaling indicates scheduling information of the first channel.

In one embodiment, the sentence that the first signaling is used for scheduling a first channel includes a meaning that the first signaling indicates scheduling information of a signal transmitted in the first channel.

In one embodiment, the scheduling information comprises one or more of time-domain resource, frequency-domain resource, a Modulation and Coding Scheme (MCS), a DeModulation Reference Signal (DMRS) port, a Hybrid Automatic Repeat reQuest (HARQ) process number, a Redundancy Version (RV) or a New Data Indicator (NDI).

In one embodiment, the first channel comprises a physical channel.

In one embodiment, the first channel comprises a layer 1 (L1) channel.

In one embodiment, the first channel comprises a transport channel.

In one embodiment, the first channel comprises a downlink channel.

In one embodiment, the first channel only comprises a downlink channel.

In one embodiment, the first channel comprises an uplink channel.

In one embodiment, the first channel only comprises an uplink channel.

In one embodiment, the first channel comprises a physical shared channel.

In one embodiment, the first channel only comprises a physical shared channel.

In one embodiment, the first channel comprises a Physical Downlink Shared Channel (PDSCH).

In one embodiment, the first channel only comprises a PDSCH.

In one embodiment, the first channel is a PDSCH.

In one embodiment, the first channel comprises a Down-Link-Shared CHannel (DL-SCH).

In one embodiment, the first channel is a DL-SCH.

In one embodiment, the first channel comprises an UpLink-Shared CHannel (UL-SCH).

In one embodiment, the first channel is a UL-SCH.

In one embodiment, the first channel comprises a PDSCH scheduled by the first signaling.

In one embodiment, the first channel comprises each PDSCH scheduled by the first signaling.

In one embodiment, the first channel consists of all PDSCHs scheduled by the first signaling.

In one embodiment, the first signaling schedules multiple physical channels, where the first channel comprises the multiple physical channels scheduled by the first signaling.

In one subembodiment, the first channel consists of the multiple physical channels scheduled by the first signaling.

In one subembodiment, the physical channel is a PDSCH.

In one subembodiment, the physical channel is a PUSCH.

In one embodiment, the first signaling schedules multiple repetitions of a first bit block, the first bit block comprising at least one of a Transport Block (TB), a Code Block (CB) or a Code Block Group (CBG); the first channel comprises all physical channels occupied by the multiple repetitions of the first bit block.

In one subembodiment, the first channel consists of all physical channels occupied by the multiple repetitions of the first bit block.

In one subembodiment, the physical channel is a PDSCH.

In one subembodiment, the physical channel is a PUSCH.

In one embodiment, the sentence that the first signaling schedules multiple repetitions of a first bit block includes a meaning that the first signaling is used to determine a size of the first bit block.

In one embodiment, the sentence that the first signaling schedules multiple repetitions of a first bit block includes a meaning that the first signaling indicates a number of the multiple repetitions of the first bit block.

In one embodiment, the sentence that the first signaling schedules multiple repetitions of a first bit block includes a meaning that the first signaling indicates scheduling information of each repetition among the multiple repetitions of the first bit block.

In one embodiment, the second channel comprises a physical channel.

In one embodiment, the second channel comprises a layer 1 (L1) channel.

In one embodiment, the second channel comprises a transport channel.

In one embodiment, the second channel comprises a downlink channel.

In one embodiment, the second channel comprises an uplink channel.

In one embodiment, the first channel only comprises a downlink channel, and the second channel comprises an uplink channel.

In one embodiment, the first channel only comprises an uplink channel, and the second channel comprises a downlink channel.

In one embodiment, the first channel comprises a downlink channel, and the second channel comprises an uplink channel.

In one embodiment, the first channel comprises an uplink channel, and the second channel comprises a downlink channel.

In one embodiment, the second channel comprises a physical control channel.

In one embodiment, the first channel only comprises a physical shared channel, and the second channel comprises a physical control channel.

In one embodiment, the first channel comprises a physical shared channel, and the second channel comprises a physical control channel.

In one embodiment, the second channel comprises a PDSCH.

In one embodiment, the second channel only comprises a PDSCH.

In one embodiment, the second channel comprises a PUSCH.

In one embodiment, the second channel only comprises a PUSCH.

In one embodiment, the first channel only comprises a PDSCH, and the second channel comprises a PUSCH.

In one embodiment, the first channel only comprises a PUSCH, and the second channel comprises a PDSCH.

In one embodiment, the first channel comprises a PDSCH, and the second channel comprises a PUSCH.

In one embodiment, the first channel comprises a PUSCH, and the second channel comprises a PDSCH.

In one embodiment, the second channel comprises a PDCCH.

In one embodiment, the second channel is a PDCCH.

In one embodiment, the second channel consists of multiple PDCCHs.

In one embodiment, the first channel only comprises a PDSCH, and the second channel comprises a PDCCH.

In one embodiment, the first channel only comprises a PUSCH, and the second channel comprises a PDCCH.

In one embodiment, the first channel comprises a PDSCH, and the second channel comprises a PDCCH.

In one embodiment, the first channel comprises a PUSCH, and the second channel comprises a PDCCH.

In one embodiment, the second channel comprises a DL-SCH.

In one embodiment, the second channel comprises a UL-SCH.

In one embodiment, the first channel comprises a DL-SCH, and the second channel comprises a UL-SCH.

In one embodiment, the first channel comprises a UL-SCH, and the second channel comprises a DL-SCH.

In one embodiment, the second channel is unrelated to the first signaling.

In one embodiment, time-frequency resources occupied by the second channel are unrelated to the first signaling.

In one embodiment, scheduling information of the second channel is unrelated to the first signaling.

In one embodiment, scheduling information of a signal transmitted in the second channel is unrelated to the first signaling.

Embodiment 2

Embodiment 2 illustrates a schematic diagram of a network architecture according to one embodiment of the present application, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The 5G NR or LTE network 200 can be called a 5G System/Evolved Packet System (5GS/EPS) 200 or other appropriate terms. The 5GS/EPS 200 may comprise one or more UEs 201, a UE 241 in sidelink communication with the UE(s) 201, an NG-RAN 202, a 5G CoreNetwork/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services or other cellular networks. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present application includes the UE 201.

In one embodiment, the second node in the present application includes the gNB203.

In one embodiment, a radio link between the UE201 and the gNB203 is a cellular link.

In one embodiment, a transmitter for the first signal in the present application includes the UE201.

In one embodiment, a receiver for the first signal in the present application includes the gNB203.

In one embodiment, a transmitter for the first signaling in the present application includes the gNB203.

In one embodiment, a receiver for the first signaling in the present application includes the UE201.

In one embodiment, a transmitter for the first-type channel in the present application includes the gNB203.

In one embodiment, a receiver for the first-type channel in the present application includes the UE201.

Embodiment 3

Embodiment 3 illustrates a schematic diagram of an example of a radio protocol architecture of a user plane and a control plane according to the present application, as shown in FIG. 3.

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node or between two UEs. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signal is generated by the PHY 301, or the PHY 351.

In one embodiment, the first signaling is generated by the PHY 301, or the PHY 351.

In one embodiment, the first signaling is generated by the MAC sublayer 302, or the MAC sublayer 352.

In one embodiment, the first-type channel is generated by the PHY 301, or the PHY 351.

Embodiment 4

Embodiment 4 illustrates a schematic diagram of a first communication device and a second communication device according to one embodiment of the present application, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any parallel stream targeting the second communication device 450. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor

459 is also in charge of using ACK and/or NACK protocols for error detection as a way to support HARQ operation.

In a transmission from the second communication device 450 to the first communication device 410, at the second communication device 450, the data source 467 is config- ured to provide a higher-layer packet to the controller/ processor 459. The data source 467 represents all protocol layers above the L2 layer. Similar to a transmitting function of the first communication device 410 described in DL, the controller/processor 459 performs header compression, encryption, packet segmentation and reordering, and multi- plexing between a logical channel and a transport channel based on radio resource allocation for the first communica- tion device 410 so as to provide the L2 layer functions used for the user plane and the control plane. The controller/ processor 459 is responsible for HARQ operation, retrans- mission of a lost packet and a signaling to the first commu- nication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting proces- sor 468 then modulates generated parallel streams into multicarrier/single-carrier symbol streams. The modulated symbol streams, after being subjected to analog precoding/ beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiv- ing function of the second communication device 450 described in the transmission from the first communication device 410 to the second communication device 450. Each receiver 418 receives a radio frequency signal via a corre- sponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communica- tion device 450. The higher-layer packet coming from the controller/processor 475 may be provided to the core net- work. The controller/processor 475 can also perform error detection using ACK and/or NACK protocols to support HARQ operation.

In one embodiment, the second communication device 450 comprises at least one processor and at least one memory, the at least one memory comprises computer program codes; the at least one memory and the computer program codes are configured to be used in collaboration with the at least one processor. The second communication device 450 at least: transmits the first signal; as a response to the action of transmitting the first signal, monitors the first-type channel in the first resource set; receives the first signaling; and continues monitoring the first-type channel in the first resource set after the target time, or, stops monitor- ing the first-type channel in the first resource set after the target time;

In one embodiment, the second communication device 450 comprises a memory that stores a computer readable instruction program, the computer readable instruction pro- gram generates actions when executed by at least one processor, which include: transmitting the first signal; as a response to the action of transmitting the first signal, moni- toring the first-type channel in the first resource set; receiv- ing the first signaling; and continuing monitoring the first- type channel in the first resource set after the target time, or, stopping monitoring the first-type channel in the first resource set after the target time.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: receives the first signal; and transmits the first signaling.

In one embodiment, the first communication device 410 comprises a memory that stores a computer readable instruc- tion program, the computer readable instruction program generates actions when executed by at least one processor, which include: receiving the first signal; and transmitting the first signaling.

In one embodiment, the first node in the present applica- tion comprises the second communication device 450.

In one embodiment, the second node in the present application comprises the first communication device 410.

In one embodiment, at least one of the antenna 420, the receiver 418, the receiving processor 470, the multi-antenna receiving processor 472, the controller/processor 475 or the memory 476 is used to receive the first signal; at least one of the antenna 452, the transmitter 454, the transmitting processor 468, the multi-antenna transmitting processor 457, the controller/processor 459, or the memory 460 is used to transmit the first signal.

In one embodiment, at least one of the antenna 452, the receiver 454, the receiving processor 456, the multi-antenna receiving processor 458, the controller/processor 459, the memory 460 or the data source 467 is used to receive the first signaling; at least one of the antenna 420, the transmitter 418, the transmitting processor 416, the multi-antenna trans- mitting processor 471, the controller/processor 475 or the memory 476 is used to transmit the first signaling.

In one embodiment, at least one of the antenna 452, the receiver 454, the receiving processor 456, the multi-antenna receiving processor 458, the controller/processor 459, the memory 460 or the data source 467 is used to monitor the first-type channel in the first resource set.

In one embodiment, at least one of the antenna 420, the transmitter 418, the transmitting processor 416, the multi- antenna transmitting processor 471, the controller/processor 475 or the memory 476 is used to transmit the first-type channel in the first resource set.

Embodiment 5

Embodiment 5 illustrates a flowchart of wireless trans- mission according to one embodiment of the present appli- cation, as shown in FIG. 5. In FIG. 5, a second node U1 and a first node U2 are communication nodes that transmit via an air interface. In FIG. 5, steps marked by boxes F51 to F56 are optional, respectively.

The second node U1 transmits first information in step S5101; receives a first signal in step S511; and transmits a first-type channel in a first resource set in step S5102; transmits a first signaling in step S512; and transmits a third signal in a first channel in step S5103; receives a second signal in step S5104; receives a fourth signal in a first channel in step S5105; and in step S5106, transmits the first-type channel in the first resource set after a target time, or, stops transmitting the first-type channel in the first resource set after the target time.

The first node U2 receives first information in step S5201; and transmits a first signal in step S521; and in step S522, as a response to the action of transmitting the first signal, monitors a first-type channel in a first resource set; receives a first signaling in step S523; receives a third signal in a first channel in step S5202; and transmits a second signal in step S5203; transmits a fourth signal in a first channel in step S5204; in step S524, continues monitoring the first-type channel in the first resource set after a target time, or, stops monitoring the first-type channel in the first resource set after the target time.

In Embodiment 5, the first signal is used for a random access, and the first signal is used by the second node U1 to determine a target reference signal; for the monitoring of the first-type channel in the first resource set, the first node U2 assumes same QCL parameters as the target reference signal; the first signaling comprises DCI; the first signaling is used by the first node U2 to determine the target time; the first signaling is used for scheduling the first channel; the first signaling is used by the first node U2 to determine a first transmission state, the first transmission state being applied for the first channel; when the first transmission state is only applied for the first channel, the first node U2 continues monitoring the first-type channel in the first resource set after the target time; when the first transmission state is also applied for at least a second channel apart from the first channel, the first node U2 stops monitoring the first-type channel in the first resource set after the target time.

In one embodiment, the first node U2 is the first node in the present application.

In one embodiment, the second node U1 is the second node in the present application.

In one embodiment, an air interface between the second node U1 and the first node U2 includes a radio interface between a base station and a UE.

In one embodiment, an air interface between the second node U1 and the first node U2 includes a radio interface between a UE and another UE.

In one embodiment, the second node U1 is a maintenance base station for a serving cell of the first node U2.

In one embodiment, the first signaling is used by the second node U1 to determine the target time.

In one embodiment, the first signal is transmitted on a PRACH.

In one embodiment, the first signal is transmitted on a PUSCH.

In one embodiment, the first signal is transmitted on a PUCCH.

In one embodiment, the first signal is transmitted on a PRACH and a PUSCH.

In one embodiment, the first signal is transmitted on a PUCCH and a PUSCH.

In one embodiment, the first signaling is transmitted in a downlink physical layer control channel (i.e., a downlink channel only capable of bearing physical layer signaling).

In one embodiment, the first signaling is transmitted on a Physical Downlink Control Channel (PDCCH).

In one embodiment, the first signaling is transmitted on a Physical Sidelink Control Channel (PSCCH).

In one embodiment, the steps marked by the box F51 in FIG. 5 exist; the first information is used by the first node U2 to determine whether the first transmission state is also applied for at least the second channel apart from the first channel.

In one embodiment, the first information is transmitted on a PDSCH.

In one embodiment, the first information is transmitted on a PDCCH.

In one embodiment, the step marked by the box F52 in FIG. 5 exists; the second node U1 transmits the first-type channel in the first resource set.

In one embodiment, as a response to the action of receiving the first signal, the second node U1 transmits the first-type channel in the first resource set.

In one embodiment, the steps marked by the box F54 in FIG. 5 exist; the second signal is used by the second node U1 to determine that the first signaling is correctly received.

In one embodiment, time-domain resources occupied by the second signal are used by the first node U2 to determine the target time.

In one embodiment, time-domain resources occupied by the second signal are used by the second node U1 to determine the target time.

In one embodiment, the first signaling is used by the first node U2 to determine time-domain resources occupied by the second signal.

In one embodiment, the second signal is transmitted on a PUCCH.

In one embodiment, the second signal is transmitted on a PUSCH.

In one embodiment, steps marked by the box F53 and the box F54 in FIG. 5 both exist; the first signaling comprises scheduling information of the third signal, the second signal comprising a HARQ-ACK for the third signal.

In one embodiment, the third signal is transmitted on a PDSCH.

In one embodiment, the steps marked by the box F55 in FIG. 5 exist; the first signaling comprises scheduling information of the fourth signal, where time-domain resources occupied by the fourth signal are used by the first node U2 to determine the target time; the first signaling is used by the first node U2 to determine time-domain resources occupied by the fourth signal.

In one embodiment, the fourth signal comprises a baseband signal.

In one embodiment, the fourth signal comprises a radio signal.

In one embodiment, the fourth signal comprises a radio frequency signal.

In one embodiment, the fourth signal is transmitted on a PUSCH.

In one embodiment, a time interval between the target time and a third reference time is a fifth interval; the third reference time is earlier than the target time, where time-domain resources occupied by the fourth signal are used to determine the third reference time.

In one embodiment, the third reference time is a start time of time-domain resources occupied by the fourth signal.

In one embodiment, the third reference time is an end time of time-domain resources occupied by the fourth signal.

In one embodiment, the third reference time is a start time of a time unit occupied by the fourth signal.

In one embodiment, the third reference time is an end time of a time unit occupied by the fourth signal.

In one embodiment, the fifth interval is measured in slots.

In one embodiment, the fifth interval is measured in multicarrier symbols.

In one embodiment, the fifth interval is a non-negative integer.

In one embodiment, the fifth interval is fixed.

In one embodiment, the fifth interval is configured by a higher layer parameter.

In one embodiment, the first signaling indicates time-domain resources occupied by the fourth signal.

In one embodiment, the first signaling belongs to a third time unit in time domain, while the fourth signal belongs to a fourth time unit in time domain, where a time interval between the third time unit and the fourth time unit is a sixth interval.

In one embodiment, the sixth interval is fixed.

In one embodiment, the first signaling indicates the sixth interval.

In one embodiment, the sixth interval is measured in slots.

In one embodiment, the sixth interval is measured in multicarrier symbols.

In one embodiment, the sixth interval is a non-negative integer.

In one embodiment, the first signaling indicates a position of a first multicarrier symbol occupied by the fourth signal in the fourth time unit.

In one embodiment, steps marked by the box F54 and steps marked by the box F55 in FIG. 5 cannot co-exist.

In one embodiment, steps marked by the box F53 and steps marked by the box F55 in FIG. 5 cannot co-exist.

In one embodiment, the step marked by the box F56 in FIG. 5 exists; when the first transmission state is only applied for the first channel, the second node U1 continues transmitting the first-type channel in the first resource set after the target time; when the first transmission state is also applied for at least the second channel apart from the first channel, the second node U1 stops transmitting the first-type channel in the first resource set after the target time.

Embodiment 6

Embodiment 6 illustrates a schematic diagram of a first transmission state being applied for a given channel according to one embodiment of the present application, as shown in FIG. 6. In Embodiment 6, the given channel is the first channel, or, the given channel is the second channel. In Embodiment 6, the first transmission state indicates a first reference signal.

In one embodiment, the given channel is the first channel.

In one embodiment, the given channel is the second channel.

In one embodiment, the given channel is a channel different from the first channel and the second channel.

In one embodiment, the first transmission state is a TCI state.

In one embodiment, the first transmission state comprises information in all or partial fields in an IE.

In one embodiment, the first transmission state comprises all or partial information in a TCI-State IE.

In one embodiment, the specific definition of the TCI-State IE can be found in 3GPP TS38.331.

In one embodiment, the first transmission state indicates an identifier of the first reference signal.

In one embodiment, the identifier of the first reference signal includes an NZP-CSI-RS-ResourceId.

In one embodiment, the identifier of the first reference signal includes an SSB-Index.

In one embodiment, the identifier of the first reference signal includes an SRS-ResourceId.

In one embodiment, the first transmission state indicates a cell identifier corresponding to the first reference signal.

In one embodiment, a cell identifier corresponding to the first reference signal includes a ServCellIndex.

In one embodiment, the first transmission state indicates a BWP identifier corresponding to the first reference signal.

In one embodiment, the first transmission state indicates that a QCL type corresponding to the first reference signal is a first QCL type.

In one embodiment, the first QCL type is QCL-TypeA or QCL-TypeD.

In one embodiment, the first QCL type is one of QCL-TypeA, QCL-TypeB, QCL-TypeC or QCL-TypeD.

In one embodiment, the first reference signal comprises a CSI-RS.

In one embodiment, the first reference signal comprises an NZP CSI-RS.

In one embodiment, the first reference signal comprises an SSB.

In one embodiment, the first reference signal comprises an SRS.

In one embodiment, the first reference signal is a CSI-RS or an SSB.

In one embodiment, the first reference signal is one of a CSI-RS, an SSB or an SRS.

In one embodiment, the first reference signal is the target reference signal.

In one embodiment, the first reference signal and the target reference signal are QCL.

In one embodiment, the first reference signal and the target reference signal are QCL, with QCL-TypeD.

In one embodiment, the first reference signal and the target reference signal are non-QCL.

In one embodiment, the first reference signal and the target reference signal are not QCL with QCL-TypeD.

In one embodiment, the sentence of a first transmission state being applied for a given channel means that a TCI state of the given channel is the first transmission state.

In one embodiment, the sentence of a first transmission state being applied for a given channel means that the first transmission state is used to determine a QCL relation of the given channel.

In one embodiment, the sentence of a first transmission state being applied for a given channel means that the first transmission state is used to determine a QCL parameter of the given channel.

In one embodiment, the sentence of a first transmission state being applied for a given channel means that the first transmission state is used to determine a spatial relation of the given channel.

In one embodiment, the sentence of a first transmission state being applied for a given channel means that the first reference signal is used to determine a QCL relation of DMRS of the given channel.

In one embodiment, the sentence of a first transmission state being applied for a given channel means that the first reference signal is used to determine a spatial relation of DMRS of the given channel.

In one embodiment, the sentence of a first transmission state being applied for a given channel means that the first reference signal is used to determine a QCL relation of the given channel.

In one embodiment, the sentence of a first transmission state being applied for a given channel means that the first reference signal is used to determine a QCL parameter of the given channel.

In one embodiment, the sentence of a first transmission state being applied for a given channel means that the first reference signal is used to determine a spatial relation of the given channel.

In one embodiment, the sentence of a first transmission state being applied for a given channel means that the first node assumes that a transmission antenna port of the given channel and the first reference signal are QCL.

In one embodiment, the sentence of a first transmission state being applied for a given channel means that the first node assumes that a transmission antenna port of the given channel and the first reference signal are QCL with the first QCL type.

In one embodiment, the sentence of a first transmission state being applied for a given channel means that the first node receives the first reference signal and the given channel using a same spatial domain filter.

In one embodiment, the sentence of a first transmission state being applied for a given channel means that the first node transmits the first reference signal and receives the given channel using a same spatial domain filter.

In one embodiment, the sentence of a first transmission state being applied for a given channel means that the first node receives the first reference signal and transmits the given channel using a same spatial domain filter.

In one embodiment, the sentence of a first transmission state being applied for a given channel means that the first node transmits the first reference signal and the given channel using a same spatial domain filter.

In one embodiment, the sentence of a first transmission state being applied for a given channel means that large-scale properties of a channel over which the first reference signal is conveyed can be used to infer large-scale properties of a channel over which the given channel is conveyed.

In one embodiment, the large-scale properties include one or more of a delay spread, a Doppler spread, a Doppler shift, an average delay or a Spatial Rx parameter.

Embodiment 7

Figure 7:
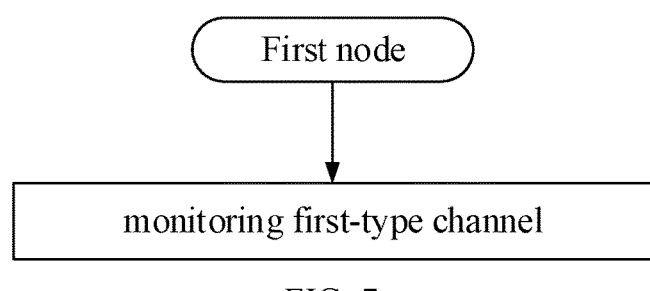
FIG. 7 illustrates a schematic diagram of monitoring a second given channel according to one embodiment of the present application.

Embodiment 7 illustrates a schematic diagram of monitoring a first-type channel according to one embodiment of the present application, as shown in FIG. 7.

In one embodiment, the phrase of monitoring a first-type channel means: monitoring a Downlink control information (DCI) format transmitted in the first-type channel.

In one embodiment, the phrase of monitoring a first-type channel means: monitoring a PDCCH candidate to determine whether the first-type channel is transmitted.

In one embodiment, the phrase of monitoring a first-type channel means: monitoring a PDCCH candidate to determine whether the first-type channel is transmitted in a PDCCH candidate.

In one embodiment, the phrase of monitoring a first-type channel means: monitoring a PDCCH candidate to determine whether a DCI format is detected in a PDCCH candidate.

In one embodiment, the phrase of monitoring a first-type channel means: monitoring a PDCCH candidate to determine whether a DCI format is detected in a PDCCH candidate to be transmitted in the first-type channel.

In one embodiment, the monitoring refers to blind decoding, the phrase of monitoring a first-type channel meaning:

performing decoding operation in a PDCCH candidate; if it is determined that decoding is correct in a PDCCH candidate according to CRC, it is then determined that a DCI format is detected in the PDCCH candidate; otherwise, it is determined that no DCI format is detected in the PDCCH candidate.

In one embodiment, the monitoring refers to blind decoding, the phrase of monitoring a first-type channel meaning: performing decoding operation in a PDCCH candidate; if it is determined that decoding is correct in a PDCCH candidate according to CRC, it is then determined that a DCI format is detected in the PDCCH candidate to be transmitted in the first-type channel; otherwise, it is determined that no DCI format is detected in the PDCCH candidate.

In one embodiment, the monitoring refers to coherent detection, the phrase of monitoring a first-type channel meaning: performing coherent reception in a PDCCH candidate and measuring energy of a signal obtained by the coherent reception; if the energy of the signal obtained by the coherent reception is larger than a first given threshold in a PDCCH candidate, it is then determined that a DCI format is detected in the PDCCH candidate to be transmitted in the first-type channel; otherwise, it is determined that no DCI format is detected in the PDCCH candidate.

In one embodiment, the monitoring refers to energy detection, the phrase of monitoring a first-type channel meaning: sensing energy of radio signals in a PDCCH candidate and averaging to obtain a received energy; if the received energy is larger than a second given threshold in a PDCCH candidate, it is then determined that a DCI format is detected in the PDCCH candidate to be transmitted in the first-type channel; otherwise, it is determined that no DCI format is detected in the PDCCH candidate.

In one embodiment, the phrase of monitoring a first-type channel means: determining according to CRC whether the first-type channel is transmitted, and being unsure of whether the first-type channel is to be transmitted before determining whether decoding is correct according to CRC.

In one embodiment, the phrase of monitoring a first-type channel means: determining according to CRC whether there exists a DCI being transmitted in the first-type channel, and being unsure of whether there exists a DCI being transmitted in the first-type channel before determining whether decoding is correct according to CRC.

In one embodiment, the phrase of monitoring a first-type channel means: determining according to coherent detection whether the first-type channel is to be transmitted; being unsure of whether the first-type channel is to be transmitted before coherent detection.

In one embodiment, the phrase of monitoring a first-type channel means: determining according to coherent detection whether there exists a DCI being transmitted in the first-type channel; being unsure of whether there exists a DCI being transmitted in the first-type channel before coherent detection.

In one embodiment, the phrase of monitoring a first-type channel means: determining according to energy detection whether the first-type channel is to be transmitted; being unsure of whether the first-type channel is to be transmitted before energy detection.

In one embodiment, the phrase of monitoring a first-type channel means: determining according to energy detection whether there exists a DCI being transmitted in the first-type channel; being unsure of whether there exists a DCI being transmitted in the first-type channel before energy detection.

Embodiment 8

Figure 8:
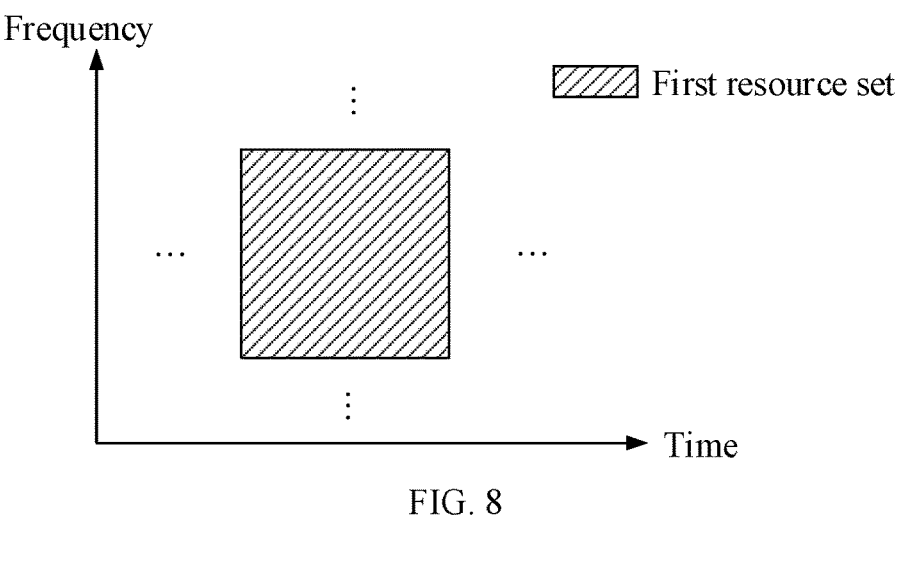
FIG. 8 illustrates a schematic diagram of a first resource set according to one embodiment of the present application.

Embodiment 8 illustrates a schematic diagram of a first resource set according to one embodiment of the present application; as shown in FIG. 8. In Embodiment 8, the first resource set occupies a positive integer number of Resource Element(s) (RE(s)) in time-frequency domain.

In one embodiment, an RE occupies a multicarrier symbol in time domain, and a subcarrier in frequency domain.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first resource set occupies a positive integer number of multicarrier symbol(s) in time domain.

In one embodiment, the first resource set occupies a positive integer number of RB(s) in frequency domain.

In one embodiment, the first resource set comprises a search space set.

In one embodiment, the first resource set is a search space set.

In one embodiment, the first resource set comprises one or more PDCCH candidates.

In one embodiment, the first resource set comprises all or partial PDCCH candidates in a search space set.

In one embodiment, the first resource set comprises a COntrol REsource SET (CORESET).

In one embodiment, the first resource set is a CORESET.

In one embodiment, the first resource set occurs periodically in time domain.

In one embodiment, the first resource set occurs multiple times in time domain.

In one embodiment, the first resource set occurs only once in time domain.

In one embodiment, a search space set to which the first resource set belongs is identified by a recoverySearchSpaceId.

In one embodiment, the first resource set is a search space set, the first resource set being identified by a recoverySearchSpaceId.

In one embodiment, a SearchSpaceId corresponding to a search space set to which the first resource set belongs is equal to a recoverySearchSpaceId.

In one embodiment, the first resource set is a search space set, where a SearchSpaceId corresponding to the first resource set is equal to a recoverySearchSpaceId.

In one embodiment, the first resource set is configured by a first higher layer parameter.

In one embodiment, the first resource set is a search space set, where a SearchSpaceId corresponding to the first resource set is configured by a first higher layer parameter.

In one embodiment, the first resource set is a search space set, where first higher layer parameter indicates a SearchSpaceId corresponding to the first resource set.

In one embodiment, the first node is configured with K resource sets, K being a positive integer greater than 1; the first resource set is one of the K resource sets; a first higher layer parameter indicates the first resource set from the K resource sets.

In one embodiment, the first higher layer parameter comprises information contained by a recoverySearchSpaceId field in a BeamFailureRecoveryConfig IE.

In one embodiment, names of the first higher layer parameter include recoverySearchSpaceId.

In one embodiment, the K resource sets belong to a same BWP in frequency domain.

In one embodiment, the K resource sets belong to a same Carrier in frequency domain.

In one embodiment, the K resource sets belong to a same cell.

In one embodiment, the K resource sets respectively comprise K search space sets.

In one embodiment, the K resource sets are respectively K search space sets.

In one embodiment, the K resource sets respectively comprise K CORESETs.

In one embodiment, the K resource sets are configured by a higher layer parameter searchSpacesToAddModList.

In one embodiment, the K resource sets are configured by a higher layer parameter searchSpacesToReleaseList.

In one embodiment, the K resource sets are respectively identified by K indexes, where the K indexes are mutually unequal; any of the K indexes is a non-negative integer.

In one embodiment, the K indexes are respectively search space identifiers corresponding to the K resource sets.

In one embodiment, the K indexes are respectively CORESET identifiers corresponding to the K resource sets.

Embodiment 9

Figure 9:
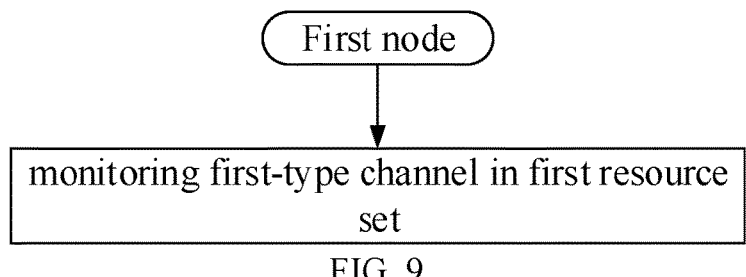
FIG. 9 illustrates a schematic diagram of a first node monitoring a first-type channel in a first resource set according to one embodiment of the present application.

Embodiment 9 illustrates a schematic diagram of a first node monitoring a first-type channel in a first resource set according to one embodiment of the present application; as shown in FIG. 9. In Embodiment 9, for the monitoring of the first-type channel in the first resource set, the first node assumes same QCL parameters as the target reference signal.

In one embodiment, the first-type channel comprises a physical channel.

In one embodiment, the first-type channel is a physical channel.

In one embodiment, the first-type channel comprises a layer 1 (L1) channel.

In one embodiment, the first-type channel is a layer 1 (L1) channel.

In one embodiment, the first-type channel is for an RNTI in a second identifier set.

In one embodiment, the first-type channel is identified by an RNTI in a second identifier set.

In one embodiment, CRC of a DCI transmitted in the first-type channel is scrambled by an RNTI in a second identifier set.

In one embodiment, the first-type channel comprises a downlink physical layer control channel (i.e., a downlink channel only capable of bearing physical layer signaling).

In one embodiment, the first-type channel comprises a PDCCH.

In one embodiment, the first-type channel is a PDCCH.

In one embodiment, the first-type channel is a PDCCH for an RNTI in a second identifier set.

In one embodiment, the first-type channel is a PDCCH of which the CRC is scrambled by an RNTI in a second identifier set.

In one embodiment, the second identifier set comprises at least one RNTI.

In one embodiment, the second identifier set comprises a C-RNTI.

In one embodiment, the second identifier set only comprises a C-RNTI.

In one embodiment, the second identifier set comprises an MCS-C-RNTI.

In one embodiment, the second identifier set consists of a C-RNTI and an MCS-C-RNTI.

In one embodiment, the second identifier set comprises a Random Access (RA)-RNTI.

In one embodiment, the second identifier set consists of a C-RNTI and a RA-RNTI.

In one embodiment, the second identifier set consists of a C-RNTI, MCS-C-RNTI and a RA-RNTI.

In one embodiment, the first identifier set is the second identifier set.

In one embodiment, there exists one RNTI in the first identifier set that does not belong to the second identifier set.

In one embodiment, there exists one RNTI in the second identifier set that does not belong to the first identifier set.

In one embodiment, the QCL refers to being Quasi-Co-Located.

In one embodiment, the QCL includes QCL Type-A.

In one embodiment, the QCL includes QCL Type-B.

In one embodiment, the QCL includes QCL Type-C.

In one embodiment, the QCL includes QCL Type-D.

In one embodiment, the sentence that for the monitoring of the first-type channel in the first resource set, the first node assumes same QCL parameters as the target reference signal means that: the first node assumes that a transmission antenna port of the first-type channel being transmitted in the first resource set is QCL with the target reference signal.

In one embodiment, the sentence that for the monitoring of the first-type channel in the first resource set, the first node assumes same QCL parameters as the target reference signal means that: the first node assumes that a transmission antenna port of the first-type channel being transmitted in the first resource set is QCL with the target reference signal, corresponding to QCL-TypeD.

In one embodiment, the sentence that for the monitoring of the first-type channel in the first resource set, the first node assumes same QCL parameters as the target reference signal means that: with the target reference signal and a fourth reference signal being QCL, the first node assumes that a transmission antenna port of the first-type channel being transmitted in the first resource set is QCL with the fourth reference signal.

In one embodiment, the sentence that for the monitoring of the first-type channel in the first resource set, the first node assumes same QCL parameters as the target reference signal means that: the first node receives the target reference signal and monitors the first-type channel in the first resource set using a same spatial domain filter.

In one embodiment, the sentence that for the monitoring of the first-type channel in the first resource set, the first node assumes same QCL parameters as the target reference signal means that: the first node transmits the target reference signal and monitors the first-type channel in the first resource set using a same spatial domain filter.

In one embodiment, the sentence that for the monitoring of the first-type channel in the first resource set, the first node assumes same QCL parameters as the target reference signal means that: with the target reference signal and a fourth reference signal being QCL, the first node receives the fourth reference signal and monitors the first-type channel in the first resource set using a same spatial domain filter.

In one embodiment, the sentence that for the monitoring of the first-type channel in the first resource set, the first node assumes same QCL parameters as the target reference signal means that: large-scale properties of a channel over which the first-type channel transmitted in the first resource set is conveyed can be inferred from large-scale properties of a channel over which the target reference signal is conveyed.

In one embodiment, the sentence that for the monitoring of the first-type channel in the first resource set, the first node assumes same QCL parameters as the target reference signal means that: with the target reference signal and a fourth reference signal being QCL, large-scale properties of a channel over which the first-type channel transmitted in the first resource set is conveyed can be inferred from large-scale properties of a channel over which the fourth reference signal is conveyed.

In one embodiment, the fourth reference signal comprises an SSB.

Embodiment 10

Figure 10:
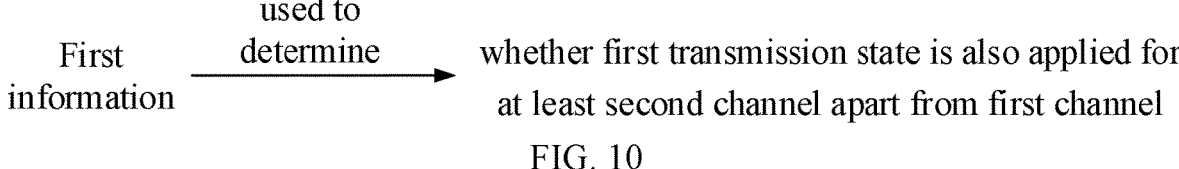
FIG. 10 illustrates a schematic diagram of first information according to one embodiment of the present application.

Embodiment 10 illustrates a schematic diagram of first information according to one embodiment of the present application; as shown in FIG. 10. In Embodiment 10, the first information is used to determine whether the first transmission state is also applied for at least the second channel apart from the first channel.

In one embodiment, the first information indicates that the first transmission state is only applied for the first channel, or, the first information indicates that the first transmission state is also applied for at least the second channel apart from the first channel.

In one embodiment, the first information is carried by a higher layer signaling.

In one embodiment, the first information is carried by an RRC signaling.

In one embodiment, the first information is carried by a MAC CE.

In one embodiment, the first information is carried by a physical layer signaling.

In one embodiment, the first information is carried by a layer 1 (L1) signaling.

In one embodiment, the first information is carried by a higher layer signaling and an L1 signaling together.

In one embodiment, the first information is carried by the first signaling.

In one embodiment, the first signaling comprises a second field, the second field comprising at least one binary bit; the second field in the first signaling indicates whether the first transmission state is also applied for at least the second channel apart from the first channel.

In one embodiment, the second field only comprises one binary bit; if the binary bit is equal to a first bit value, the first transmission state is only applied for the first channel; if the binary bit is unequal to the first bit value, the first transmission state is also applied for at least the second channel apart from the first channel.

In one embodiment, the first bit value is equal to 0.

In one embodiment, the first bit value is equal to 1.

In one embodiment, a second higher layer parameter indicates whether the first transmission state is also applied for at least the second channel apart from the first channel.

In one embodiment, the second higher layer parameter is an RRC parameter.

In one embodiment, the second higher layer parameter is a MAC CE parameter.

In one embodiment, the second higher layer parameter comprises information in one or multiple fields in an IE.

In one embodiment, the second higher layer parameter comprises information in one or multiple fields in a MAC CE.

In one embodiment, the second higher layer parameter explicitly indicates whether the first transmission state is also applied for at least the second channel apart from the first channel.

In one embodiment, the second higher layer parameter comprises a second bit field, the second bit field comprising at least one binary bit, where a value of the second bit field indicates whether the first transmission state is also applied for at least the second channel apart from the first channel.

In one embodiment, the second bit field only comprises one binary bit; if a value of the second bit field is equal to a first bit value, the first transmission state is only applied for the first channel; if a value of the second bit field is unequal to the first bit value, the first transmission state is also applied for at least the second channel apart from the first channel.

In one embodiment, the second higher layer parameter implicitly indicates whether the first transmission state is also applied for at least the second channel apart from the first channel.

In one embodiment, other information indicated by the second higher layer parameter is used to determine whether the first transmission state is also applied for at least the second channel apart from the first channel.

In one embodiment, the second higher layer parameter is used to determine a first version number; if the first version number belongs to a first version number set, the first transmission state is only applied for the first channel; if the first version number belongs to a second version number set, the first transmission state is also applied for at least the second channel apart from the first channel; the first version number set and the second version number set respectively comprise at least one version number.

In one embodiment, the first version number set comprises Release 15 (R15).

In one embodiment, the first version number set comprises R16.

In one embodiment, the second version number set comprises R17.

In one embodiment, frequency-domain resources occupied by the first signal are used to determine whether the first transmission state is also applied for at least the second channel apart from the first channel.

In one embodiment, the first signal belongs to a first frequency-domain range in frequency domain, the first frequency-domain range being used to determine whether the first transmission state is also applied for at least the second channel apart from the first channel.

In one embodiment, if the first frequency-domain range belongs to a first frequency-domain range set, the first transmission state is only applied for the first channel; if the first frequency-domain range belongs to a second frequency-domain range set, the first transmission state is also applied for at least the second channel apart from the first channel; the first frequency-domain range set and the second frequency-domain range set respectively comprise at least one frequency-domain range.

In one embodiment, a said frequency-domain range is a contiguous frequency-domain resource.

In one embodiment, a said frequency-domain range is a BWP.

In one embodiment, a said frequency-domain range is a Carrier.

In one embodiment, the first frequency-domain range set comprises a middle-frequency-domain range within a Frequency Range (FR) 1.

In one embodiment, the second frequency-domain range set comprises a frequency-domain range within a FR2.

In one embodiment, the first signal is transmitted in a first cell, the first cell being used to determine whether the first transmission state is also applied for at least the second channel apart from the first channel.

In one embodiment, if the first cell belongs to a first cell set, the first transmission state is only applied for the first channel; if the first cell belongs to a second cell set, the first transmission state is also applied for at least the second channel apart from the first channel; the first cell set and the second cell set respectively comprise at least one cell.

In one embodiment, the first signaling implicitly indicates whether the first transmission state is also applied for at least the second channel apart from the first channel.

In one embodiment, other information indicated by the first signaling is used to determine whether the first transmission state is also applied for at least the second channel apart from the first channel.

In one embodiment, time-frequency resources occupied by the first signal are used to determine whether the first transmission state is also applied for at least the second channel apart from the first channel.

In one embodiment, if time-frequency resources occupied by the first signaling belong to a first time-frequency resource set, the first transmission state is only applied for the first channel; if time-frequency resources occupied by the first signaling belong to a second time-frequency resource set, the first transmission state is also applied for at least the second channel apart from the first channel.

In one embodiment, CRC of the first signaling is scrambled by a first RNTI, the first RNTI being used to determine whether the first transmission state is also applied for at least the second channel apart from the first channel.

In one embodiment, if the first RNTI belongs to a first identifier subset, the first transmission state is only applied for the first channel; if the first RNTI belongs to a second identifier subset, the first transmission state is also applied for at least the second channel apart from the first channel; the first identifier subset and the second identifier subset respectively comprise at least one RNTI.

Embodiment 11

Embodiment 11 illustrates a schematic diagram of a first condition set according to one embodiment of the present application; as shown in FIG. 11. In Embodiment 11, only when each condition in a first condition set is satisfied, the first node stops monitoring the first-type channel in the first resource set after the target time when the first transmission state is also applied for at least the second channel apart from the first channel; the first condition set comprises at least one condition.

In one embodiment, the first condition set only comprises one condition.

In one embodiment, the first condition set comprises multiple conditions.

In one embodiment, if a condition in the first condition set is unsatisfied, when the first transmission state is also applied for at least the second channel apart from the first channel, the first node continues monitoring the first-type channel in the first resource set after the target time.

In one embodiment, if a condition in the first condition set is unsatisfied, whether the first node continues monitoring the first-type channel in the first resource set after the target time is unrelated to whether the first transmission state is also applied for at least the second channel apart from the first channel.

In one embodiment, only when each condition in the first condition set is satisfied, whether the first transmission state is also applied for at least the second channel apart from the first channel is used to determine whether to continue monitoring the first-type channel in the first resource set after the target time.

In one embodiment, the first condition set comprises that the first signaling is transmitted in the first resource set.

In one embodiment, the first condition set only comprises that the first signaling is transmitted in the first resource set.

In one embodiment, if the first signaling is transmitted outside the first resource set, whether the first node continues monitoring the first-type channel in the first resource set after the target time is unrelated to whether the first transmission state is also applied for at least the second channel apart from the first channel.

In one embodiment, the first condition set comprises that the first node does not receive a second-type signaling after transmitting the first signal and before receiving the first signaling.

In one embodiment, the first condition set only comprises that the first node does not receive the second-type signaling after transmitting the first signal and before receiving the first signaling.

In one embodiment, the first condition set comprises that the first signaling is transmitted in the first resource set, and the first node does not receive the second-type signaling after transmitting the first signal and before receiving the first signaling.

In one embodiment, only when the first node does not receive the second-type signaling after transmitting the first signal and before receiving the first signaling, the first node continues monitoring the first-type channel in the first resource set after the target time as the first transmission state is only applied for the first channel.

In one embodiment, if the first node receives the second-type signaling after transmitting the first signal and before receiving the first signaling, the first node has already stopped monitoring the first-type channel in the first resource set before the target time.

In one embodiment, the second-type signaling comprises a higher-layer signaling.

In one embodiment, the second-type signaling is a higher-layer signaling.

In one embodiment, the second-type signaling comprises a MAC CE.

In one embodiment, the second-type signaling is a MAC CE.

In one embodiment, the second-type signaling comprises an RRC signaling.

In one embodiment, the second-type signaling comprises a TCI state activation MAC CE.

In one embodiment, the second-type signaling is a TCI state activation MAC CE.

In one embodiment, the second-type signaling comprises a TCI state activation/de-activation MAC CE.

In one embodiment, the second-type signaling is a TCI state activation/de-activation MAC CE.

In one embodiment, the second-type signaling comprises a UE-specific PDSCH TCI state activation/de-activation MAC CE.

In one embodiment, the second-type signaling comprises an Enhanced UE-specific PDSCH TCI state activation/de-activation MAC CE.

In one embodiment, the second-type signaling comprises a TCI state indication MAC CE.

In one embodiment, the second-type signaling is a TCI state indication MAC CE.

In one embodiment, the second-type signaling comprises a UE-specific PDCCH TCI state indication MAC CE.

In one embodiment, any said second-type signaling is one of a UE-specific PDSCH TCI state activation/de-activation MAC CE, an Enhanced UE-specific PDSCH TCI state activation/de-activation MAC CE or a UE-specific PDCCH TCI state indication MAC CE.

In one embodiment, the first signaling is not a said second-type signaling.

In one embodiment, the first signal belongs to a first frequency-domain range in frequency domain, the first condition set comprising that the first node does not receive a second-type signaling within the first frequency-domain range after transmitting the first signal and before receiving the first signaling.

In one embodiment, the first signal is transmitted in a first cell; the first condition set comprises that the first node does not receive a second-type signaling in the first cell after transmitting the first signal and before receiving the first signaling.

In one embodiment, the second-type signaling is transmitted on a PDSCH.

Embodiment 12

Embodiment 12 illustrates a schematic diagram of a second signal according to one embodiment of the present application; as shown in FIG. 12. In Embodiment 12, the second signal is used to determine that the first signaling is correctly received; time-domain resources occupied by the second signal are used to determine the target time, the first signaling being used to determine the time-domain resources occupied by the second signal.

In one embodiment, the second signal indicates that the first signaling is correctly received.

In one embodiment, the second signal comprises a baseband signal.

In one embodiment, the second signal comprises a radio signal.

In one embodiment, the second signal comprises a radio frequency signal.

In one embodiment, the second signal comprises UCI.

In one embodiment, the second signal comprises Hybrid Automatic Repeat Request-Acknowledgement (HARQ-ACK).

In one embodiment, the second signal comprises an ACK.

In one embodiment, the first channel does not include a channel occupied by the second signal.

In one embodiment, the first channel does not include a physical channel occupied by the second signal.

In one embodiment, the first signaling is used to determine a radio resource occupied by the second signal.

In one embodiment, the radio resource comprises a time-frequency resource.

In one embodiment, the radio resource comprises a code-domain resource.

In one embodiment, the code-domain resource comprises one or more of a pseudo-random sequence, a low-PAPR sequence, a cyclic shift, an Orthogonal Cover Code (OCC), a frequency-domain orthogonal sequence or a time-domain orthogonal sequence.

In one embodiment, the first signaling is used to determine a first PUCCH resource, the second signal being transmitted in the first PUCCH resource.

In one embodiment, the first signaling comprises a third field, the third field comprising at least one binary bit; the third field in the first signaling indicates the first PUCCH resource.

In one embodiment, a time-frequency resource occupied by the first signaling is used to determine the first PUCCH resource.

In one embodiment, a transmitter of the first signaling determines whether the first signaling is correctly received according to whether the second signal is received; if the second signal is received, it is determined that the first signaling is correctly received; if the second signal is not received, it is determined that the first signaling is not correctly received.

In one embodiment, time-domain resources occupied by the second signal are used to determine the target time.

In one embodiment, a time interval between the target time and a second reference time is a third interval; the second reference time is earlier than the target time, where time-domain resources occupied by the second signal are used to determine the second reference time.

In one embodiment, the second reference time is a start time of time-domain resources occupied by the second signal.

In one embodiment, the second reference time is an end time of time-domain resources occupied by the second signal.

In one embodiment, the second reference time is a start time of a time unit occupied by the second signal.

In one embodiment, the second reference time is an end time of a time unit occupied by the second signal.

In one embodiment, the third interval is measured in the time unit.

In one embodiment, the third interval is measured in slots.

In one embodiment, the third interval is measured in sub-slots.

In one embodiment, the third interval is measured in multicarrier symbols.

In one embodiment, the third interval is a non-negative integer.

In one embodiment, the third interval is equal to 0.

In one embodiment, the third interval is greater than 0.

In one embodiment, the third interval is fixed.

In one embodiment, the third interval is configured by a higher layer parameter.

In one embodiment, the first signaling indicates time-domain resources occupied by the second signal.

In one embodiment, time-domain resources occupied by the first signaling are used to determine time-domain resources occupied by the second signal.

In one embodiment, the first signaling belongs to a first time unit in time domain, while the second signal belongs to a second time unit in time domain, where a time interval between the first time unit and the second time unit is a fourth interval.

In one embodiment, the third signal belongs to a first time unit in time domain, while the second signal belongs to a second time unit in time domain, where a time interval between the first time unit and the second time unit is a fourth interval.

In one embodiment, the fourth interval is default.

In one embodiment, the fourth interval is fixed.

In one embodiment, the first signaling indicates the fourth interval.

In one embodiment, the fourth interval is configured by a RRC signaling.

In one embodiment, the fourth interval is measured in the time unit.

In one embodiment, the fourth interval is measured in slots.

In one embodiment, the fourth interval is measured in multicarrier symbols.

In one embodiment, the fourth interval is a non-negative integer.

In one embodiment, the fourth interval is equal to 0.

In one embodiment, the fourth interval is greater than 0.

In one embodiment, an end time of the first time unit is no later than a start time of the second time unit.

In one embodiment, a time interval between two time units refers to: a time interval between a start time of a former one of the two time units and a start time of a latter one of the two time units.

In one embodiment, a time interval between two time units refers to: a time interval between an end time of a former one of the two time units and an end time of a latter one of the two time units.

In one embodiment, a time interval between two time units refers to: a time interval between an end time of a former one of the two time units and a start time of a latter one of the two time units.

In one embodiment, a position of a first multicarrier symbol occupied by the second signal in the second time unit is configured by an RRC signaling.

Embodiment 13

Embodiment 13 illustrates a schematic diagram of a third signal according to one embodiment of the present application; as shown in FIG. 13. In Embodiment 13, the third signal is transmitted in the first channel; the first signaling comprises scheduling information of the third signal, the second signal comprising a HARQ-ACK for the third signal.

In one embodiment, the HARQ-ACK comprises an ACK.

In one embodiment, the HARQ-ACK comprises a Negative ACKnowledgement (NACK).

In one embodiment, the third signal comprises a baseband signal.

In one embodiment, the third signal comprises a radio signal.

In one embodiment, the third signal comprises a radio frequency signal.

In one embodiment, the third signal carries a first bit block, the first bit block comprising one of a TB, a CB or a CBG.

In one embodiment, the first channel includes a physical channel occupied by the third channel.

In one embodiment, the first channel includes a transport channel occupied by the third channel.

In one embodiment, the second signal indicates whether the third signal is correctly received.

In one embodiment, the second signal indicates that the third signal is correctly received.

In one embodiment, the second signal indicates whether the first bit block is correctly received.

In one embodiment, the second signal indicates that the first bit block is correctly received.

In one embodiment, the first signaling indicates time-frequency resources occupied by the third signal.

In one embodiment, the first signaling indicates time-domain resources occupied by the third signal.

In one embodiment, the first signaling belongs to a fifth time unit in time domain, while the third signal belongs to a sixth time unit in time domain, where the first signaling indicates a time interval between the fifth time unit and the sixth time unit.

In one embodiment, the first signaling indicates a position of a first multicarrier symbol occupied by the third signal in the sixth time unit.

In one embodiment, an end time of the fifth time unit is no later than a start time of the sixth time unit.

Embodiment 14

Embodiment 14 illustrates a structure block diagram of a processing device used in a first node according to one embodiment of the present application; as shown in FIG. 14. In FIG. 14, a processing device 1400 in the first node comprises a first transmitter 1401 and a first processor 1402.

In Embodiment 14, the first transmitter 1401 transmits a first signal; the first processor 1402, as a response to the action of transmitting the first signal, monitors a first-type channel in a first resource set; receives a first signaling; and continues monitoring the first-type channel in the first resource set after the target time, or, stops monitoring the first-type channel in the first resource set after the target time.

In Embodiment 14, the first signaling is used to determine the target time; the first signal is used for a random access, and the first signal is used to determine a target reference signal; for the monitoring of the first-type channel in the first resource set, the first node assumes a same QCL parameter as the target reference signal; the first signaling comprises DCI; the first signaling is used for scheduling a first channel; the first signaling is used to determine a first transmission state, the first transmission state being applied for the first channel; when the first transmission state is only applied for the first channel, the first node continues monitoring the first-type channel in the first resource set after the target time; when the first transmission state is also applied for at least a second channel apart from the first channel, the first node stops monitoring the first-type channel in the first resource set after the target time.

In one embodiment, first information is used to determine whether the first transmission state is also applied for at least the second channel apart from the first channel.

In one embodiment, only when each condition in a first condition set is satisfied, the first node stops monitoring the first-type channel in the first resource set after the target time when the first transmission state is also applied for at least the second channel apart from the first channel; the first condition set comprises at least one condition.

In one embodiment, the first condition set comprises that the first signaling is transmitted in the first resource set.

In one embodiment, the first condition set comprises that the first node does not receive a second-type signaling after transmitting the first signal and before receiving the first signaling.

In one embodiment, the first transmitter 1401 transmits a second signal; herein, the second signal is used to determine that the first signaling is correctly received; time-domain resources occupied by the second signal are used to determine the target time, the first signaling being used to determine the time-domain resources occupied by the second signal.

In one embodiment, the first processor 1402 receives a third signal in the first channel; herein, the first signaling comprises scheduling information of the third signal, the second signal comprising a HARQ-ACK for the third signal.

In one embodiment, the first node is a UE.

In one embodiment, the first node is a relay node.

In one embodiment, the first transmitter 1401 comprises at least one of the antenna 452, the transmitter 454, the transmitting processor 468, the multi-antenna transmitting processor 457, the controller/processor 459, the memory 460 or the data source 467 in Embodiment 4.

In one embodiment, the first processor 1402 comprises at least one of the antenna 452, the receiver 454, the receiving processor 456, the multi-antenna receiving processor 458, the controller/processor 459, the memory 460 or the data source 467 in Embodiment 4.

Embodiment 15

Embodiment 15 illustrates a structure block diagram of a processing device used in a second node according to one embodiment of the present application; as shown in FIG. 15. In FIG. 15, a processing device 1500 in a second node comprises a first receiver 1501 and a second transmitter 1502.

In Embodiment 15, the first receiver 1501 receives a first signal; the second transmitter 1502 transmits a first signaling.

In Embodiment 15, the first signaling is used to determine a target time; the first signal is used for a random access, and the first signal is used to determine a target reference signal; as a response to the action of transmitting the first signal, a transmitter of the first signal monitors a first-type channel in a first resource set; for the monitoring of the first-type channel in the first resource set, the transmitter of the first signal assumes a same QCL parameter as the target reference signal; the first signaling comprises DCI; the first signaling is used for scheduling a first channel; the first signaling is used to determine a first transmission state, the first transmission state being applied for the first channel; when the first transmission state is only applied for the first channel, the transmitter of the first signal continues monitoring the first-type channel in the first resource set after the target time; when the first transmission state is also applied for a second channel apart from the first channel, the transmitter of the first signal stops monitoring the first-type channel in the first resource set after the target time.

In one embodiment, first information is used to determine whether the first transmission state is also applied for at least the second channel apart from the first channel.

In one embodiment, only when each condition in a first condition set is satisfied, a transmitter of the first signal stops monitoring the first-type channel in the first resource set after the target time when the first transmission state is also applied for at least the second channel apart from the first channel; the first condition set comprises at least one condition.

In one embodiment, the first condition set comprises that the first signaling is transmitted in the first resource set.

In one embodiment, the first condition set comprises that a transmitter of the first signal does not receive a second-type signaling after transmitting the first signal and before receiving the first signaling.

In one embodiment, the first receiver 1501 receives a second signal; herein, the second signal is used to determine that the first signaling is correctly received; time-domain resources occupied by the second signal are used to determine the target time, the first signaling being used to determine the time-domain resources occupied by the second signal.

In one embodiment, the second transmitter 1502 transmits a third signal in the first channel; herein, the first signaling comprises scheduling information of the third signal, the second signal comprising a HARQ-ACK for the third signal.

In one embodiment, the second node is a base station.

In one embodiment, the second node is a UE.

In one embodiment, the second node is a relay node.

In one embodiment, the first receiver 1501 comprises at least one of the antenna 420, the receiver 418, the receiving processor 470, the multi-antenna receiving processor 472, the controller/processor 475 or the memory 476 in Embodiment 4.

In one embodiment, the second transmitter 1502 comprises at least one of the antenna 420, the transmitter 418, the transmitting processor 416, the multi-antenna transmitting processor 471, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, vehicles, automobiles, RSU, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, eNB, gNB, Transmitter Receiver Point (TRP), GNSS, relay satellite, satellite base station, airborne base station, Road Side Unit (RSU), drones, test equipment like transceiving device simulating partial functions of base station or signaling tester.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) configured for wireless communications, the UE comprising:

a receiver;

a transmitter; and a processor, wherein:

the transmitter is configured to transmit a first signal;

the processor is configured to determine a target reference signal based on the first signal;

the processor and the receiver are configured to, in response to transmission of the first signal, monitor a first-type channel in a resource set;

the receiver and the processor are configured to receive a downlink control information (DCI), wherein the DCI is used to schedule a first channel;

the processor is configured to determine a target time based on the DCI;

the processor is configured to determine a transmission state;

the processor and the receiver are configured to continue to monitor the first-type channel in the resource set after the target time on a condition that the transmission state is only applied for the first channel; and the processor and the receiver are configured to stop monitoring the first-type channel in the resource set after the target time on a condition that the transmission state is also applied for at least a second channel apart from the first channel.

2. The UE of claim 1, wherein first information is used to determine whether the transmission state is also applied for at least the second channel apart from the first channel.

3. The UE of claim 1, wherein when each condition in a first condition set is satisfied, the processor is configured to stop monitoring the first-type channel in the resource set after the target time when the transmission state is also applied for at least the second channel apart from the first channel, wherein the first condition set comprises at least one condition.

4. The UE of claim 3, wherein the first condition set comprises that the DCI is transmitted in the resource set.

5. The UE of claim 3, wherein the first condition set comprises that the UE does not receive a second-type signaling after transmitting the first signal and before receiving the DCI.

6. The UE of claim 1, wherein the transmitter is configured to transmit a second signal wherein the second signal is used to determine that the DCI is correctly received, wherein time-domain resources occupied by the second signal are used to determine the target time, wherein the DCI is used to determine the time-domain resources occupied by the second signal.

7. The UE of claim 6, wherein the processor and the receiver are configured to receive a third signal in the first channel, wherein the DCI comprises scheduling information of the third signal, wherein the second signal comprises a hybrid automatic-repeat request acknowledgement (HARQ-ACK) for the third signal.

8. A method for use in a user equipment (UE) for wireless communication, the method comprising:

transmitting a first signal;

determining a target reference signal based on the first signal;

monitoring, in response to transmitting the first signal, a first-type channel in a first resource set;

receiving a downlink control information (DCI), wherein the DCI is used to schedule a first channel;

determining a target time based on the DCI;

determining a first transmission state;

continuing monitoring the first-type channel in the first resource set after the target time on a condition that the first transmission state is only applied for the first channel; and stopping monitoring the first-type channel in the first resource set after the target time on a condition that the first transmission state is also applied for at least a second channel apart from the first channel.

9. The method of claim 8, wherein first information is used to determine whether the transmission state is also applied for at least the second channel apart from the first channel.

10. The method of claim 8, wherein when each condition in a first condition set is satisfied, the method further comprises: stopping monitoring the first-type channel in the resource set after the target time when the transmission state is also applied for at least the second channel apart from the first channel, wherein the first condition set comprises at least one condition.

11. The method of claim 10, wherein the first condition set comprises that the DCI is transmitted in the resource set.

12. The method of claim 10, wherein the first condition set comprises that the UE does not receive a second-type signaling after transmitting the first signal and before receiving the DCI.

13. The method of claim 8, further comprising:
transmitting a second signal, wherein the second signal is used to determine that the DCI is correctly received, wherein time-domain resources occupied by the second signal are used to determine the target time, wherein the DCI is used to determine the time-domain resources occupied by the second signal.

14. The method of claim 13, further comprising:
receiving a third signal in the first channel, wherein the DCI comprises scheduling information of the third signal, wherein the second signal comprises a hybrid automatic-repeat request acknowledgement (HARQ-ACK) for the third signal.

15. The UE of claim 1, wherein the DCI is used for random access.

16. The UE of claim 1, wherein the processor is configured to assumes same quasi-colocated (QCL) parameters as the target reference signal.

17. The method of claim 8, wherein the DCI is used for random access.

18. The method of claim 8, wherein the UE assumes same quasi-colocated (QCL) parameters as the target reference signal.

* * * * *